US006178481B1

United States Patent
Krueger et al.

(10) Patent No.: US 6,178,481 B1
(45) Date of Patent: Jan. 23, 2001

(54) MICROPROCESSOR CIRCUITS AND SYSTEMS WITH LIFE SPANNED STORAGE CIRCUIT FOR STORING NON-CACHEABLE DATA

(75) Inventors: Steven D. Krueger, Dallas; Jonathan H. Shiell, Plano, both of TX (US)

(73) Assignee: Texas Instruments Incorporated, Dallas, TX (US)

( * ) Notice: Under 35 U.S.C. 154(b), the term of this patent shall be extended for 0 days.

(21) Appl. No.: 08/962,987

(22) Filed: Oct. 31, 1997

Related U.S. Application Data

(60) Provisional application No. 60/029,232, filed on Oct. 31, 1996, and provisional application No. 60/008,799, filed on Dec. 18, 1995.

(51) Int. Cl.[7] .................................................. G06F 12/00
(52) U.S. Cl. ............................ 711/122; 711/136; 711/137
(58) Field of Search ................................... 711/136, 143, 711/122, 137, 146

(56) References Cited

U.S. PATENT DOCUMENTS 5,193,163 * 3/1993 Sanders et al. ...................... 711/122
5,325,499 * 6/1994 Kummer et al. ..................... 711/143
5,542,066 * 7/1996 Mattson et al. ...................... 711/136
5,579,418 * 11/1996 Williams et al. .................... 382/300

* cited by examiner

Primary Examiner—Do Hyun Yoo
Assistant Examiner—Mehdi Namazi
(74) Attorney, Agent, or Firm—Robert D. Marshall, Jr.; Gerald E. Laws; Richard L. Donaldson

(57) ABSTRACT

A microprocessor (5) for coupling to an external read/write memory (20) having an addressable storage space. This storage space stores cacheable digital data and non-cacheable (32) digital data. The microprocessor includes a data storage circuit (62) for storing a portion of the non-cacheable data. The microprocessor further includes an address storage circuit (64) for storing an address corresponding to the portion of the non-cacheable data. Still further, the microprocessor includes a counter (72) for advancing a count from an initial value (74) toward a threshold value (76) in response to an activity over time. The counter initiates its advancing operation in response to the data storage circuit receiving the portion of the non-cacheable data. Lastly, the microprocessor includes an indicator (66) for indicating the portion of the non-cacheable data in the data storage circuit is expired in response to the count reaching a threshold.

27 Claims, 8 Drawing Sheets

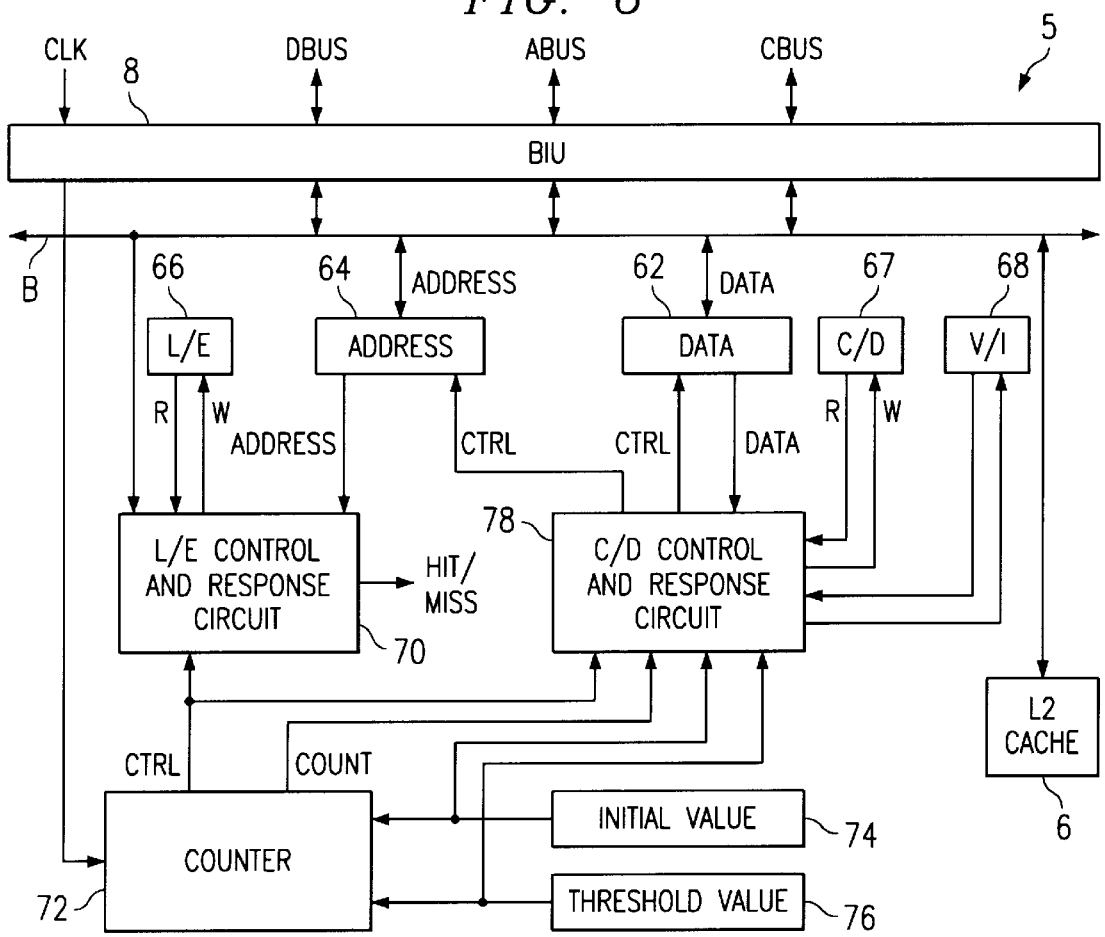
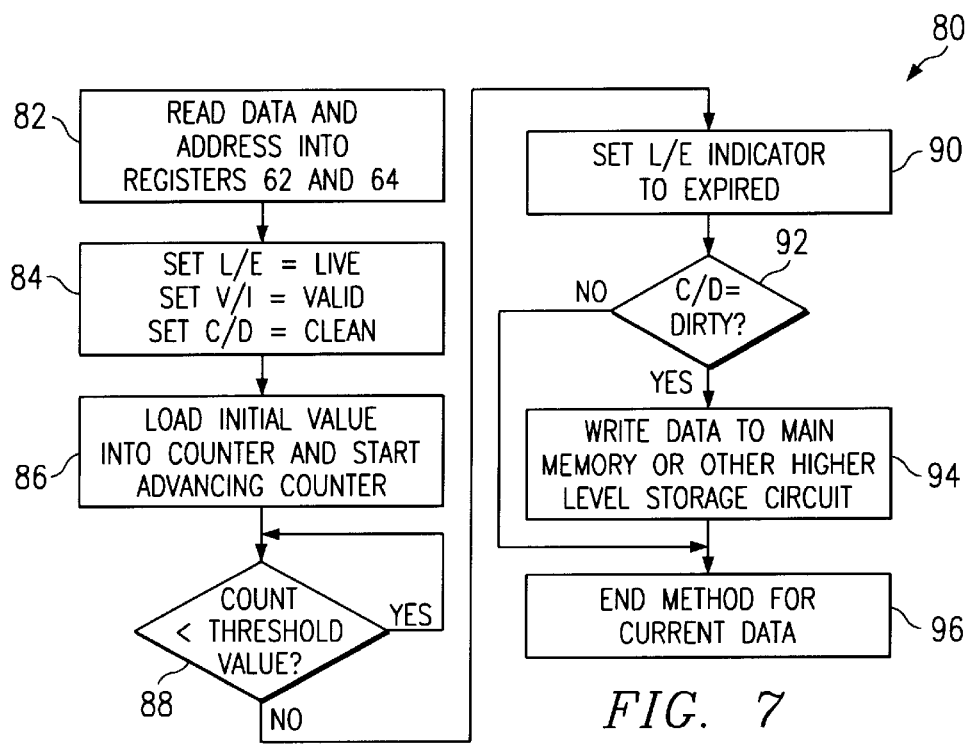

MICROPROCESSOR CIRCUITS AND SYSTEMS WITH LIFE SPANNED STORAGE CIRCUIT FOR STORING NON-CACHEABLE DATA

CROSS-REFERENCES TO RELATED APPLICATIONS

This appln claims benefit of provisional appln 60/029,232 Oct. 31, 1996.

The present application is related to co-pending U.S. Provisional Patent Application No. 60/008,799, filed Dec. 18, 1995, entitled "Microprocessor System With Burstable, Non-cacheable Memory Access Support" (attorney docket number TI-21071P), which is hereby incorporated herein by reference.

BACKGROUND OF THE INVENTION

The present embodiments relate to microprocessors, and are more particularly directed to microprocessor circuits, systems, and methods with life spanned storage circuit for storing non-cacheable data.

As is evident in the field, modern high performance data processing systems are conventionally implemented using single-chip microprocessors as the central processing units (CPU), and using semiconductor random-access memory (RAM) as main system memory. The main memory is generally implemented in the form of random access memory (RAM) devices such as dynamic RAM (DRAM), which are of high density and low cost-per-bit; however, the access and cycle times of conventional DRAM memory are relatively slow, and are not able to keep up with the clock rates of modern microprocessors.

Conventional microprocessor-based data processing systems have addressed the performance limitations of main memory access, while still obtaining the low-cost benefit of high-density DRAM, through the use of cache memories. Cache memories are typically small blocks of high speed static RAM (SRAM), either on-chip with the microprocessor or off-chip (or both), for storing the contents of memory locations that are likely to be accessed in the near future. Typically, cache memory stores the contents of memory locations that are near neighbors to a memory location that was recently accessed; because microprocessors often access memory in a sequential fashion, it is likely that successive memory accesses in successive cycles will access memory addresses that are very close to one another in the memory space. Accordingly, by storing the neighboring memory location contents in a cache, a good portion of the memory accesses may be made by the microprocessor to cache, rather than to main memory. The overall performance of the system is thus improved through the implementation of cache memory. Some modern microprocessors include multiple levels of cache memory, with the capacity of the cache increasing (and its speed decreasing) with each successive level, to optimize performance. Intelligent cache design and implementation can greatly improve system performance by minimizing accesses to main memory.

Another approach toward improving memory access performance in microprocessor-based systems is the use of special memory access cycles, commonly referred to as "burst" access cycles. Burst memory access cycles are used, in the operation of the memory devices, to provide access to a series of memory locations. Typically, the burst access is performed by way of a memory controller chip placed between the microprocessor and main memory, and which operates in response to the address information and control signals presented by the microprocessor. Burst cycles are highly effective in improving the performance of memory accesses. For example, in a modern system having an eight-byte bus, a burst cycle can access thirty-two bytes of memory with the presentation of a single memory address in as few as five bus cycles (2-1-1-1), when using a best case cache. Burst access is also highly efficient using page mode DRAM, in which a thirty-two byte access may be performed in a bus cycle sequence of 8-3-3-3 (totaling seventeen bus cycles), and using special DRAM functions such as Early Data Out (EDO) and synchronous DRAM, in which thirty-two byte burst accesses may be accomplished, in the best case, with a bus cycle sequence of 6-1-1-1 (totaling nine bus cycles). This is a drastic improvement over the non-burst case in which access of a 32-byte line requires 64 cycles when accessed as a group of eight separate 4 byte reads (considering that non-burst accesses are generally not longer than 4 bytes). As such, burst mode memory access is typically twice to six times as fast as non-burst cycles.

In microprocessors utilizing the well-known "x86" architecture, including the so-called "Pentium-class" microprocessors (referring to microprocessors having functionality and instruction set compatibility with PENTIUM microprocessors available from Intel Corporation), burst memory access are linked to cache operations. In other words, in these x86-architecture microprocessors, burst memory operations are performed only in connection with cache line fill operations (reads from memory) and cache write-back operations (writes to memory). Given the cache architecture of these microprocessors, where most data and instruction retrieval is accomplished by way of cache memory, the performance provided by performing burst memory accesses for cache operations is quite high.

Caching typically works quite well for "true" memory locations, to and from which only the microprocessor writes and reads data using conventional memory access operations, because the microprocessor can ensure that its cache copy of the memory location matches the copy in main memory. So long as the cache and main memory copies of the same memory locations are the same, reading of the cache copy instead of the main memory copy will have no side effects. However, certain memory locations, such as those containing the status of an I/O device or those portions of the screen buffer that may be changed by a graphics accelerator, are volatile to the extent that cache copies of these memory locations would be frequently out-of-date. The reading of a cache copy of these volatile memory locations, in lieu of the main memory locations, could have significant side effects in system operation. Accordingly, accesses by the microprocessor to these volatile locations are blocked from being "cacheable" (i.e., from being stored in cache memory) in conventional IBM PC architecture systems, typically by the operation of a memory controller.

For example, the memory mapped register is generally a blocked area in the cacheable access sense, despite being accessed via conventional memory access, because the memory mapped register is often polled to detect changes in device status, responsive to which certain control functions are effected. If the memory-mapped register were cached, changes in device status would be reflected in the main memory copy of the memory-mapped register but not in the cached copy; periodic polling of the memory-mapped register would read the cache copy only, and would therefore not detect the sought-for change in device status, effectively bringing control to a standstill. By way of another example, the caching of non-memory devices such as memory-mapped I/O functions may cause additional side effects for those types of I/O devices which change state in response to a read operation on the bus, since reads of on-chip cache memory do not appear as bus cycles. Write-back caching also presents side effects for these non-memory locations, as the cache could contain a more up-to-date copy than main memory; since writes to write-back cache do not appear on the bus, the caching of these locations would appear to reorder writes performed on the bus.

Another example of a memory area that is volatile and therefore typically blocked from cacheable access is video memory, which is logically within the memory map of the microprocessor and physically located either within or separate from main memory (such as in a graphics adaptor). Video memory is often under the control of a device other than the microprocessor, such as a graphics processor or graphics adaptor, and is therefore not suitable for cacheable access by the main microprocessor as its contents are frequently changed outside of the control of the microprocessor. If a portion of video memory were to be stored in the microprocessor cache, the cache contents would likely be invalid for subsequent accesses because of the changes made by the graphics processor.

According to conventional x86-architecture microprocessors, therefore, burstable memory accesses are linked to the cacheability of the memory location to be accessed. For example, the PENTIUM microprocessor requests a burstable memory access by asserting a control signal at terminal CACHE# (the # indicating that the signal is active at a low logic level) during an access to memory (indicated by the microprocessor presenting a high logic level at terminal M/IO#). Responsive to this request, the memory controller determines if the memory address presented by the microprocessor is in a cacheable area of the memory space and, if so, asserts the KEN# input to the microprocessor and effects the burst access. According to this conventional implementation, if the microprocessor requests a burstable access to an area of memory that is blocked from cacheable access, the memory controller will not effect a burstable access, and will indicate the same by deasserting KEN#. Single transfer access to the desired memory location will then proceed.

In view of the above, the present inventors have recognized various limitations of the above connection of burstable sequences to cacheability. Thus, below are presented various inventive embodiments which improved performance as measured against these prior art drawbacks.

BRIEF SUMMARY OF THE INVENTION

In the preferred embodiment, there is a microprocessor for coupling to an external read/write memory having an addressable storage space. This storage space stores cacheable digital data and non-cacheable digital data. The microprocessor includes a data storage circuit for storing a portion of the non-cacheable data. The microprocessor further includes an address storage circuit for storing an address corresponding to the portion of the non-cacheable data. Still further, the microprocessor includes a counter for advancing a count from an initial value toward a threshold value in response to an activity over time. The counter initiates its advancing operation in response to the data storage circuit receiving the portion of the non-cacheable data. Lastly, the microprocessor includes an indicator for indicating the portion of the non-cacheable data in the data storage circuit is expired in response to the count reaching a threshold. Other circuits, systems, and methods are also disclosed and claimed.

BRIEF DESCRIPTION OF THE SEVERAL VIEWS OF THE DRAWING

FIG. 6 is a schematic of an embodiment for storing non-cacheable data and a corresponding address which may be read and written by the CPU and modified during a life span as determined by a corresponding counter;

FIG. 7 is a flow chart of a method embodiment of operation of the schematic of FIG. 6;

DETAILED DESCRIPTION OF THE INVENTION

Figure 1:
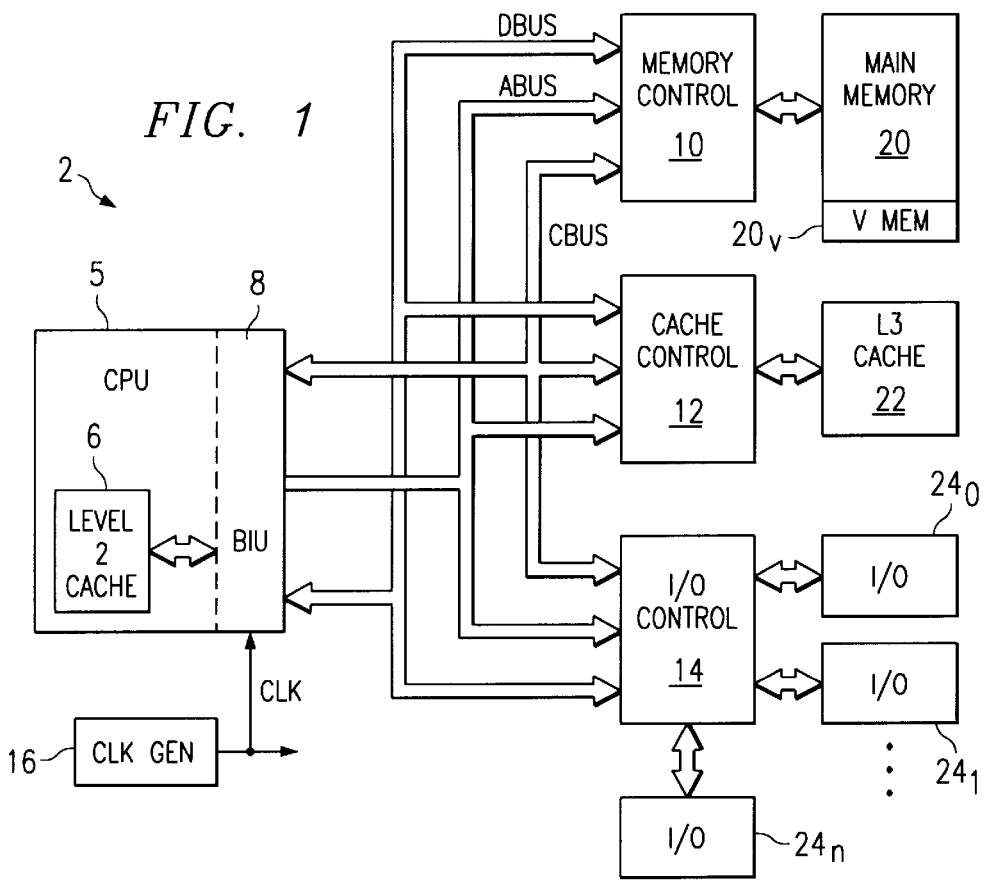
FIG. 1 is an electrical diagram, in block form, of a data processing system according to one inventive embodiment.

Referring first to FIG. 1, an exemplary microprocessor-based system 2 into which a first preferred embodiment is implemented is now described in detail. As shown in FIG. 1, system 2 includes central processing unit (CPU) 5 which, in this embodiment of the invention, is a microprocessor of the well-known "x86-architecture", and is preferably a Pentium-class microprocessor. CPU 5 includes a bus interface unit (BIU) 8. BIU 8 is circuitry within CPU 5 which serves to control and accomplish communication between CPU 5 and the remainder of system 2. In this embodiment, BIU 8 of CPU 5 is connected to a bus consisting of address bus ABUS, data bus DBUS, and control bus CBUS. As is conventional in the art, address bus ABUS is a bus upon which CPU 5 presents a binary address to access other elements of system 2, data bus DBUS is a bus for the communication of digital data between CPU 5 and the other system elements, and control bus CBUS is a bus by way of which control signals are communicated among the elements of system 2.

In system 2 of FIG. 1, various peripheral elements are connected to buses ABUS, DBUS, CBUS, by way of associated controllers, to perform usual system functions. Main memory 20 of system 2 is coupled to buses ABUS, DBUS, CBUS by memory controller 10; as such, memory controller 10 receives address values and control signals from CPU 5, and presents corresponding control signals to main memory 20 to accomplish the desired operation, which generally involves the communication of data to or from CPU 5 on data bus DBUS. System 2 also includes level 3 cache memory 22, which is connected to cache controller 12 in the conventional manner; cache controller 12 is connected to buses ABUS, DBUS, CBUS, to control the communication of data between CPU 5 and level 3 cache memory 22. In this example, level 3 cache memory 22 is a third level cache memory for system 2, with level 1 and level 2 cache memory present within CPU 5 (level 2 cache 6 being shown in FIG. 1). System 2 also includes I/O controller 14 which is connected to CPU 5 via buses ABUS, DBUS, CBUS, and which is also connected to several input/output devices 24. Input/output devices 24 may include typical input and output peripherals in system 2, such as a video monitor, a keyboard, a pointing device, disk drive subsystems, and the like. Controllers 10, 12, 14 are typically implemented by way of a so-called "chip set" that is designed to operate in conjunction with CPU 5. System 2 further includes clock generator circuit 16, which generates a periodic clock signal on line CLK for presentation to each of the elements of system 2, including CPU 5 via BIU 8, and from which internal clock signals may be generated within each of the various system elements. Accordingly, it is contemplated that system 2 corresponds to a typical modern computer, such as of the desktop, workstation or portable type, in which computer programs are stored within disk storage (represented by one of input/output devices 24) and downloaded to main memory 20 for operation.

Memory accesses are accomplished by the presentation of an address value on bus ABUS by CPU 5 in combination with the appropriate control signals on control bus CBUS (including a read/write selection signal); memory controller 10, in turn, presents the appropriate control signals to main memory 20 to access the desired location. In this example, a portion 20v of main memory 20 is video memory, which may be independently accessed by the one of I/O functions 24 that is the graphics adaptor (or controller), either by way of buses ABUS, DBUS, CBUS or by way of a second bus (not shown); alternatively, video memory 20v could be implemented as its own device on the bus, as in the case of a PCI video card. Under the control of memory controller 10, which is generally accomplished by way of a handshaking protocol between it and CPU 5 via control bus CBUS, CPU 5 either presents data on data bus DBUS (in a memory write) or receives data from data bus DBUS (in a memory read).

As illustrated in FIG. 1, both memory and input/output traffic occurs by way of the same buses, namely address bus ABUS, data bus DBUS, and control bus CBUS. Accordingly, in this embodiment as is typical for x86-architecture microprocessor-based systems, input/output accesses are performed in a similar fashion as memory accesses described above, with CPU 5 presenting an address on address bus ABUS in combination with the appropriate control signals on line CBUS. For an I/O operation, the address on address bus ABUS corresponds to a particular one of input/output functions 24. Under the control of I/O controller 14, data is then communicated from CPU 5 to the selected I/O function 24 via data bus DBUS (for an output operation) or from the selected I/O function 24 to CPU 4 via data bus DBUS (for an input operation).

Figure 2:
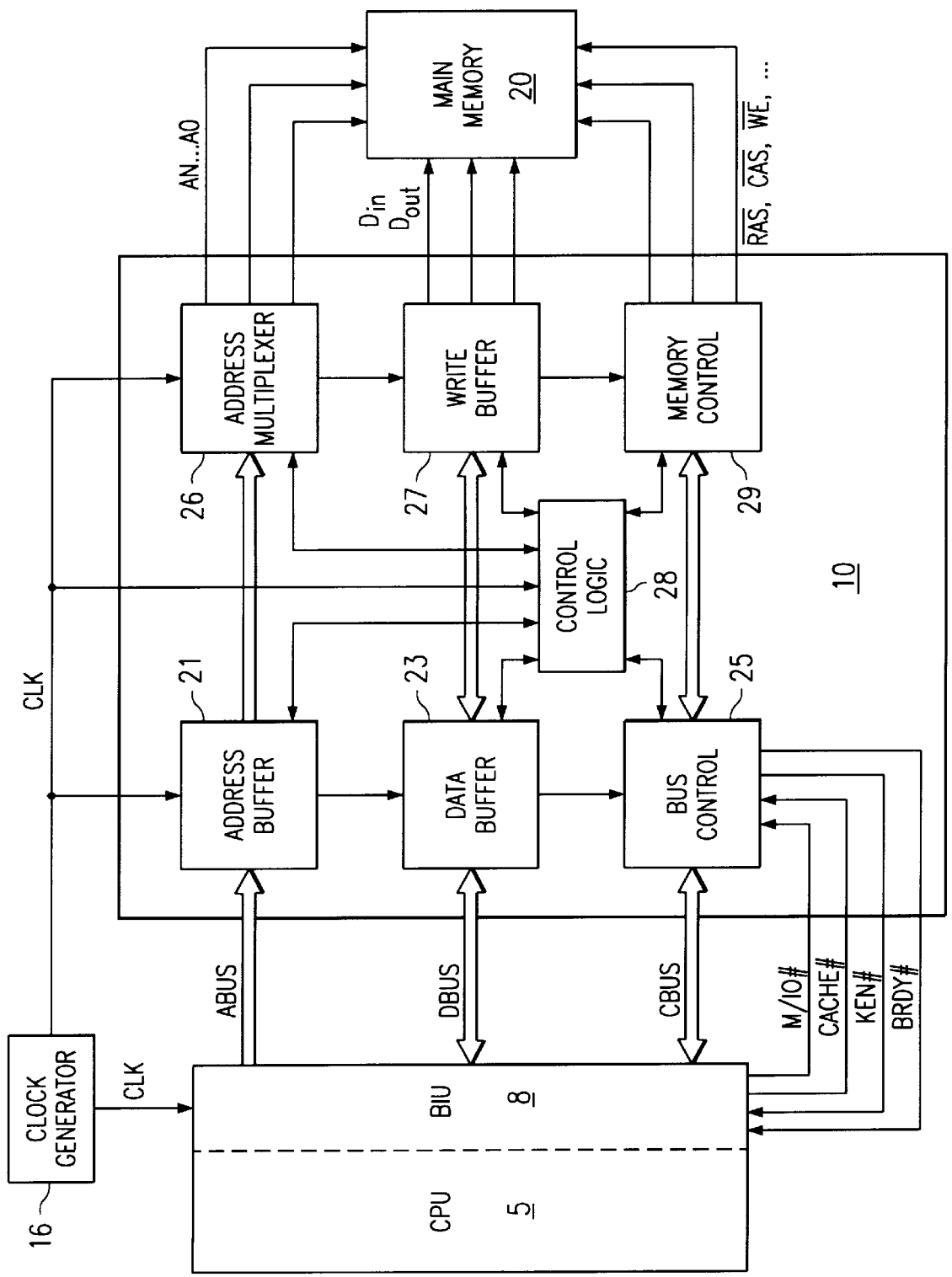
FIG. 2 is an electrical diagram of a first embodiment, in block form, of the memory and input/output controller of the system of FIG. 1.

Referring now to FIG. 2, the construction and operation of memory controller 10 according to the first embodiment, and in conjunction with CPU 5 and main memory 20, is now described in detail. As shown in FIG. 2, BIU 8 of CPU 5 communicates with memory controller 10 by way of address bus ABUS, data bus DBUS, and control bus CBUS, which are connected to specified terminals of CPU 5. The terminals of CPU 5 are its external connectors, which may be in the form of pins (as in pin-grid-array packages), solder balls, package leads, bond pads (when in chip form), or any other conventional type of external connection for integrated circuit packages. As known in the art, the terminals of CPU 5 are conventionally referred to by pin or signal names; for purposes of this description, bus lines connected to terminals of CPU 5 have the same name as their corresponding terminal. As shown in FIG. 2, control bus CBUS includes lines corresponding to terminals of CPU 5 including, in this example conventional Pentium-class microprocessor terminals such as memory/IO select M/IO#, cache request CACHE#, burst ready BRDY# and cache enable KEN#. Other conventional Pentium-class terminals used in performing memory accesses (but not shown in FIG. 2), include byte enable signals BE7#-BE0, address status signal ADS#, data/control select D/C#, write/read select W/R#, write-back/write-through signal WB/WT#, and the like. Clock generator 16 provides a clock signal on line CLK to CPU (via BIU 8) and to memory controller 10.

Memory controller 10 includes several functional blocks for providing communication between CPU 5 and main memory 20. These blocks are shown functionally in FIG. 2, as it is contemplated that one of ordinary skill in the art will fully understand the construction and operation of memory controller 10 from a functional description. As is conventional in the art, address buffer 21 receives the memory address from CPU 5 on address bus ABUS, and forwards that memory address to address multiplexer 26 for presentation to main memory 20 on address lines AN through A0. Data buffer 23 in memory controller 10 similarly receives data from CPU 5 on data bus DBUS, and forwards that data, in write operations, to write buffer 27 which is in communication with main memory 20 via data lines $D_{in}$; this path is bidirectional, however, and as such write buffer 27 may receive data from main memory 20 on lines $D_{out}$, and forward this data to data buffer 23 for presentation to CPU 5 in memory read operations.

Control of communication between CPU 5 and main memory 20 is accomplished by bus control circuit 25, connected to control bus CBUS and memory control circuit 29; in addition, memory controller 10 also includes control logic 28, which controls the internal operation of memory controller 10. In particular, bus control circuit 25 receives control signals from CPU 5 on control bus CBUS, including signals M/IO# and CACHE# and, in response to a request for memory access, instructs memory control circuit 29 to issue the appropriate conventional DRAM control and timing signals to main memory 20 to accomplish the memory access, such signals including row address strobe (RAS#), column address strobe (CAS#), write enable (WE#). In addition, bus control circuit 25 issues control signals to CPU 5 indicating the status of the memory access, such control signals include cache enable signal KEN#, as well as burst ready signal BRDY#, which is of particular importance for burst accesses as is described below.

Control logic 28 of memory controller 10 also preferably includes programmable registers for controlling the operation of memory controller 10, including registers that define non-cacheable locations of main memory 20. In response to each memory access requested by CPU 5, control logic 28 examines these registers to determine whether the desired memory address, as presented on address bus ABUS, is in a non-cacheable area of the memory address space. As is known in the art, memory controller 10 asserts line KEN# to indicate to CPU 5 that the desired memory access is cacheable, and deasserts line KEN# if the desired memory address is in a non-cacheable area.

According to the prior art, as described above relative to the Background of the Invention, burstable memory accesses were available only for memory addresses that were not in a non-cacheable area. In prior art microprocessor implementations therefore, line KEN# would be deasserted responsive to a request for memory access made to a non-cacheable area; in addition, terminal BRDY# of the microprocessor would be asserted only for the duration of a single transfer operation (read or write) made to a non-cacheable area of memory, rather than for multiple bus cycles as would be the case for a burst access.

Figure 3:
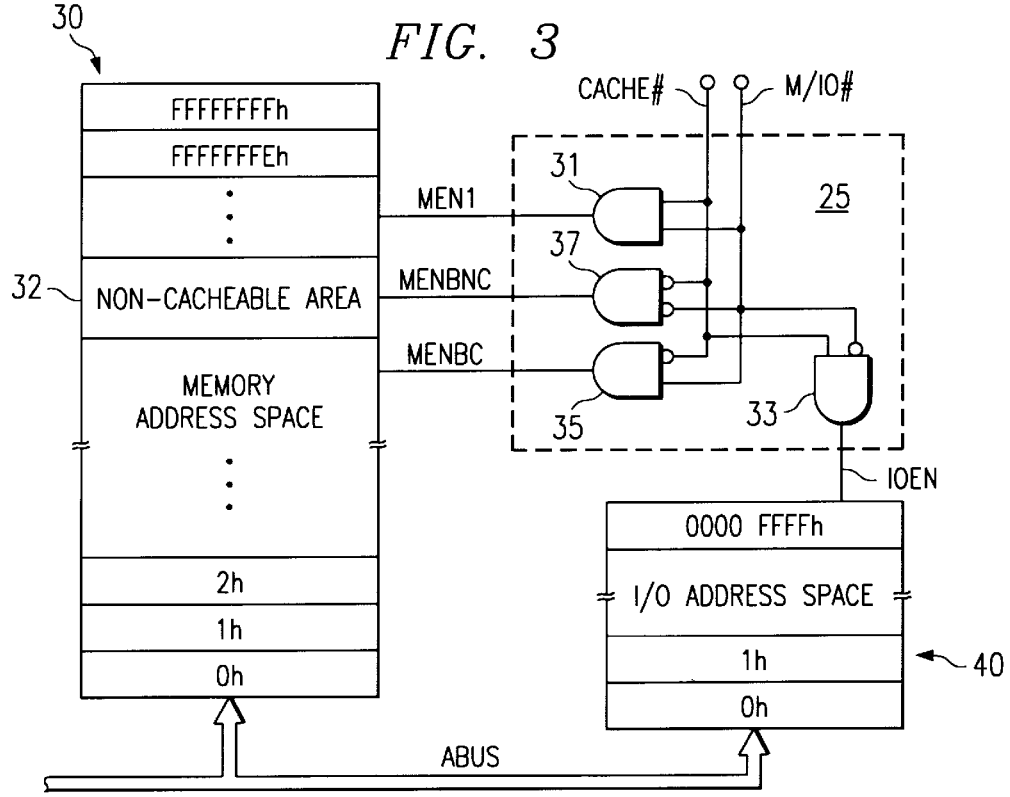
FIG. 3 is a schematic diagram of the memory address space and input/output address space of the data processing system of FIG. 1, schematically illustrating the conditions under which each address space is accessed.

FIG. 3 schematically illustrates the respective address spaces in system 2 according to this embodiment. In exemplary system 2, as is conventional for Pentium-class microprocessors, a 4 Gbyte memory address space 30 (memory addresses from 0000 0000h to FFFF FFFFh) and a 64 kbyte I/O address space 40 (memory addresses from 0000 0000h to 0000 FFFFh) are provided. Also as is typical for Pentium-class microprocessors, including CPU 5, memory address space 30 and I/O address space 40 share some of the same address values (i.e., address values between 0000 0000h and 0000 FFFFh correspond to locations both in memory address space 30 and in I/O address space 40). As described above, conventional x86-architecture microprocessors present a control signal on a terminal referred to as M/IO#, which at a high logic level indicates that a memory access was to occur, and with a low logic level indicates that an I/O operation was to occur.

As shown in FIG. 3, memory address space 30 includes a non-cacheable area 32. Non-cacheable area 32 corresponds to a region of memory address space 30 that is blocked from being accessed by way of a cache write or a cache read, as described hereinabove. Cacheable access to non-cacheable areas is prevented by memory controller 10, particularly by its control logic 28, according to the contents of certain registers containing the addresses for which cacheable access is to be prevented. Non-cacheable area 32 may include video memory 20v (see FIG. 1), or memory-mapped control registers, neither of which are typically considered suitable for cache storage. As such, the contents of non-cacheable area 32 are prevented from being stored in internal caches within CPU 5, such as level 2 cache 6 shown in FIG. 1, through the operation of memory controller 10 and its issuance of a deasserted state on line KEN#.

However, it has been discovered by the present inventors that it may be useful to provide burst access capability to non-cacheable areas of main memory 20 in x86-architecture microprocessors. For example, CPU 5 may wish to rapidly access (i.e., in a burst mode) the contents of a portion of video memory 20v in non-cacheable area 32. For example, CPU 5 may wish to copy the screen image into memory, or copy another portion of memory into video memory. Since video memory 20v is non-cacheable, prior art x86-architecture systems would prevent burstable access to non-cacheable area 32.

According to a first preferred embodiment, however, CPU 5 is able to request burstable but non-cacheable access to main memory 20, through the use of existing control signals in control bus CBUS. As indicated hereinabove, the control output signal M/IO# is used by conventional x86-architecture microprocessors to indicate whether a memory access (M/IO# high) or an I/O operation (M/IO# low) is to be performed. In contrast, according to this embodiment, the combination of a low logic level on line M/IO# in combination with assertion of the CACHE# signal (with a low logic level) is used by CPU 5 to request a burstable memory access to a non-cacheable area of memory address space 30. Memory controller 10, and specifically its bus control circuit 25, interprets this combination of M/IO# low and CACHE# low as a request for a burst memory access (rather than as an I/O request, as would be the interpretation according to the prior art), and performs a non-cacheable burst memory access to main memory 20 even if control logic 28 indicates that the memory address is within the non cacheable area 32 of memory address space 30. If CPU 5 presents an address, in combination with M/IO# and CACHE# low, that is within the cacheable area of memory address space 30, a burst access is requested and performed; however, CPU 5 does not attempt to cache the access, even though cache access is available for the addressed memory location in this case.

Memory and I/O operations according to this embodiment may thus be requested by CPU 5, via control signals M/IO# and CACHE#, according to the following Table 1 and the corresponding logic in FIG. 3:

TABLE 1

| Operation type | M/IO # | CACHE # |
| --- | --- | --- |
| Burstable, cacheable memory access | 1 | 0 |
| I/O operation (IN or OUT) | 0 | 1 |
| Nonburstable, noncacheable memory access | 1 | 1 |
| Burstable, non-cacheable memory access | 0 | 0 |

This operation is schematically illustrated in FIG. 3 by the portion of bus control circuit 25 used to drive control signals MEN1 for single memory transfer cycle (i.e., non-burstable, non-cacheable), MENBC for burstable, cacheable memory access, IOEN for I/O operation, and MENBNC for burstable, non-cacheable memory access. AND gate 31 drives line MEN1 high only in response to both of lines M/IO# and CACHE# high, AND gate 33 drives line IOEN high only in response to line M/IO# low with line CACHE# high, AND gate 35 drives line MENBC high only in response to line M/IO# high and line CACHE# low, and AND gate 37 drives line MENBNC high only in response to both of lines M/IO# and CACHE# low.

Of course, according to this embodiment, I/O controller 14 is configured to not respond to a low logic level on line M/IO# in combination with line CACHE# low, so as to prevent bus conflict due to a burstable non-cacheable memory access occurring simultaneously with an unintended I/O operation.

Figure 4A:
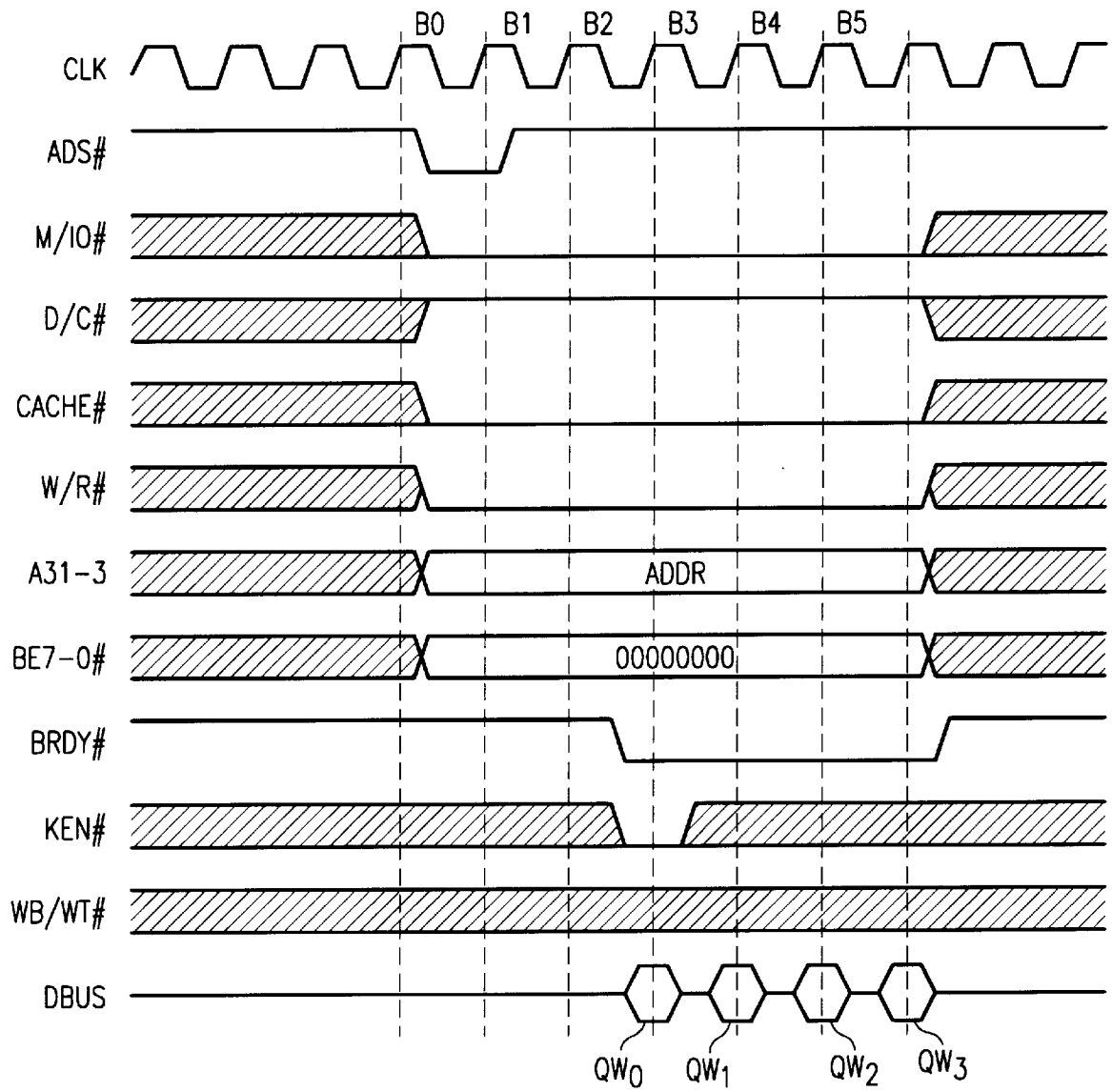
FIG. 4a is a timing diagram illustrating the request and performance of a burst read from non-cacheable memory according to the first embodiment.

Referring now to FIG. 4a, a timing diagram illustrating the operation of a burstable, non-cacheable memory read, as requested by CPU 5 and performed by main memory 20 and memory controller 10 according to this first preferred embodiment is now described, for purposes of further explanation. In this example, the read memory access is requested by CPU 5 issuing a memory address on address bus lines A31–A3 in combination with a 0 value on byte enable lines BE7#-BE0#; this address is indicated by CPU 5 as valid upon its assertion of a low logic level on line ADS#. In this example of a burstable non-cacheable memory read, the address presented by CPU 5 is within a non-cacheable area 32 of memory address space 30. In combination with the memory address, CPU 5 also issues a high logic level on line D/C# to indicate that this operation is a data operation, and asserts line W/R# low to request a memory read. These signals are conventional for x86-architecture microprocessor read operations. According to this first embodiment of the invention, CPU 5 also presents a low logic level on line M/IO# in combination with a low logic level on line CACHE#. These signals are all present in bus cycle B0 of FIG. 4a.

This combination of signals indicates to memory controller 10 that a burstable access to a non-cacheable area of main memory 20 is being requested. Memory controller 10 responds to this request by issuing the appropriate control signals and addresses to the addressed memory devices in main memory 20. In bus cycle B2 (bus cycle B1 being a wait state), memory controller 10 indicates to CPU 5 that a burstable access to main memory 20 has been granted by asserting line KEN# low, and that data bus DBUS will have valid memory data placed upon it at the end of the current clock cycle by asserting line BRDY# low. Line WB/WT# is a don't care in this operation, since the memory read is non-cacheable. Valid data, in the form of quad words QW0 through QW3 (each being 64 bits, or eight bytes), then appear upon data bus DBUS at the end of the current bus cycle B2 and the next three successive bus cycles B3 through B5 (assuming no wait states). The burst memory read according to this embodiment is then indicated as complete, by memory controller driving line BRDY# to a high state, in bus cycle B6. Subsequent memory accesses, of the burstable, non-cacheable type, or of another type, may then be performed in the conventional manner.

Figure 4B:
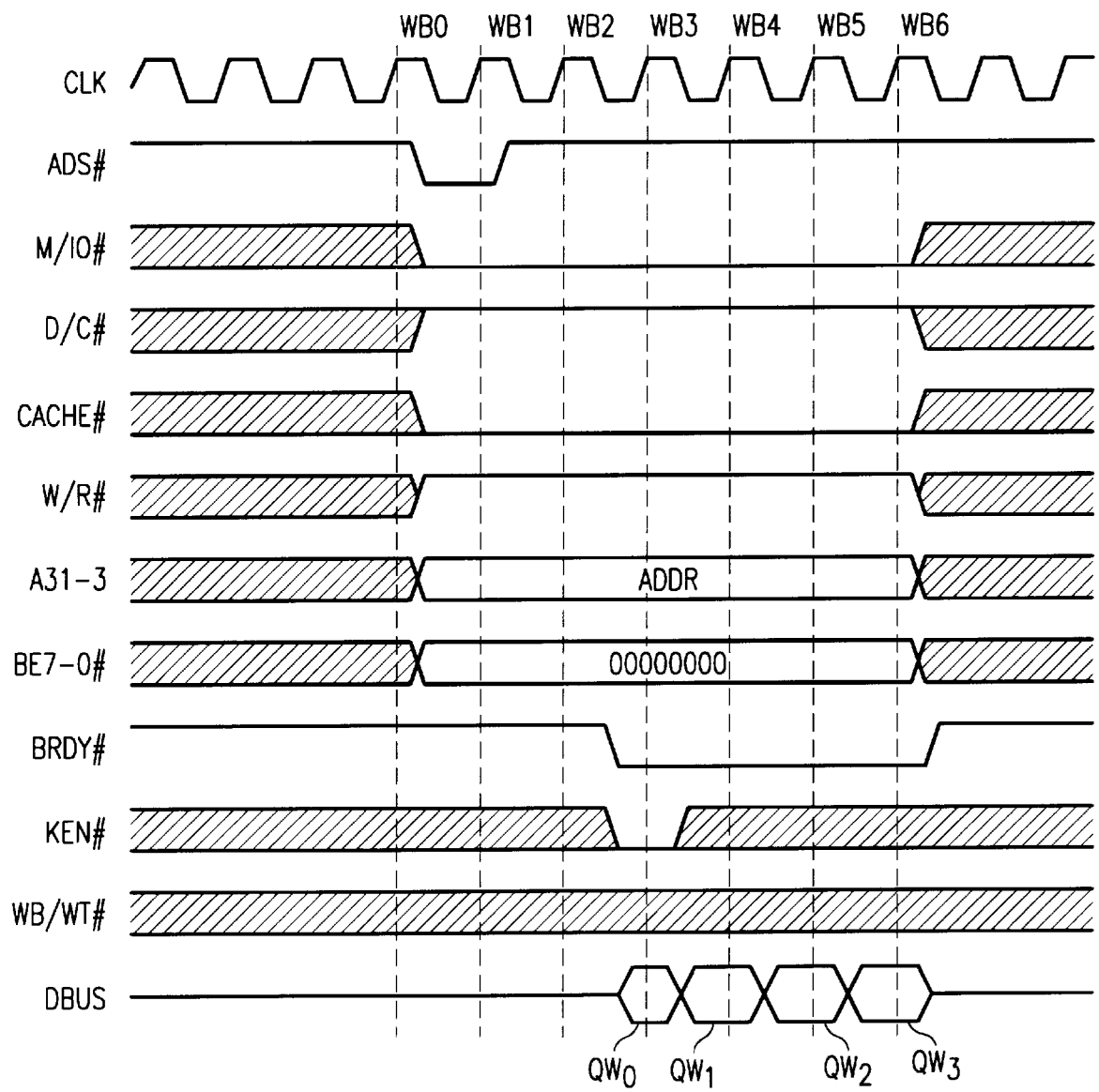
FIG. 4b is a timing diagram illustrating the request and performance of a burst write from non-cacheable memory according to the first embodiment.

Referring now to FIG. 4b, the operation of a burstable, non-cacheable memory write operation is now described in detail. Similarly as in the case of the memory read of FIG. 4a, CPU 5 initiates the operation with the presentation of the desired address on address lines A31 through A3, and the zero value for byte enable bits BE#, together with a high level on line D/C# at the time that CPU 5 asserts the ADS# signal low in bus cycle WB0. Also in this cycle WB0, CPU 5 indicates that it wishes to perform a memory write by asserting line W/R# high, and requests a burst write to a non-cacheable memory location by asserting line M/IO# low in combination with line CACHE# low. Again, as in the case of the read, if the address points to a cacheable area of memory address space 30, a burst access is performed but the write is performed via cache. In response to this request by CPU 5, memory controller 10 issues (in bus cycle WB2, after a single wait state) a low logic level on line KEN# to indicate that burst access to main memory 20 has been granted, in combination with a low logic level on line BRDY# indicating that valid data is expected at the end of the current bus cycle WB2. CPU 5 then performs the write by placing valid data onto data bus DBUS at the end of bus cycle WB2 and the subsequent three bus cycles WB3 through WB5. The burst write operation is then indicated as complete by memory controller 10 driving line BRDY# in the final bus cycle WB6.

According to this embodiment, therefore, burstable access is provided to non-cacheable areas of main memory in an x86-architecture microprocessor-based computer system. The benefits of accomplishing memory operations at burst rates are thus obtained for a wider range of memory operations, particularly in accessing memory locations that are not suitable for cacheability such as video RAM locations. In addition, such access is provided according to this embodiment without requiring an additional pin on the microprocessor.

Figure 5:
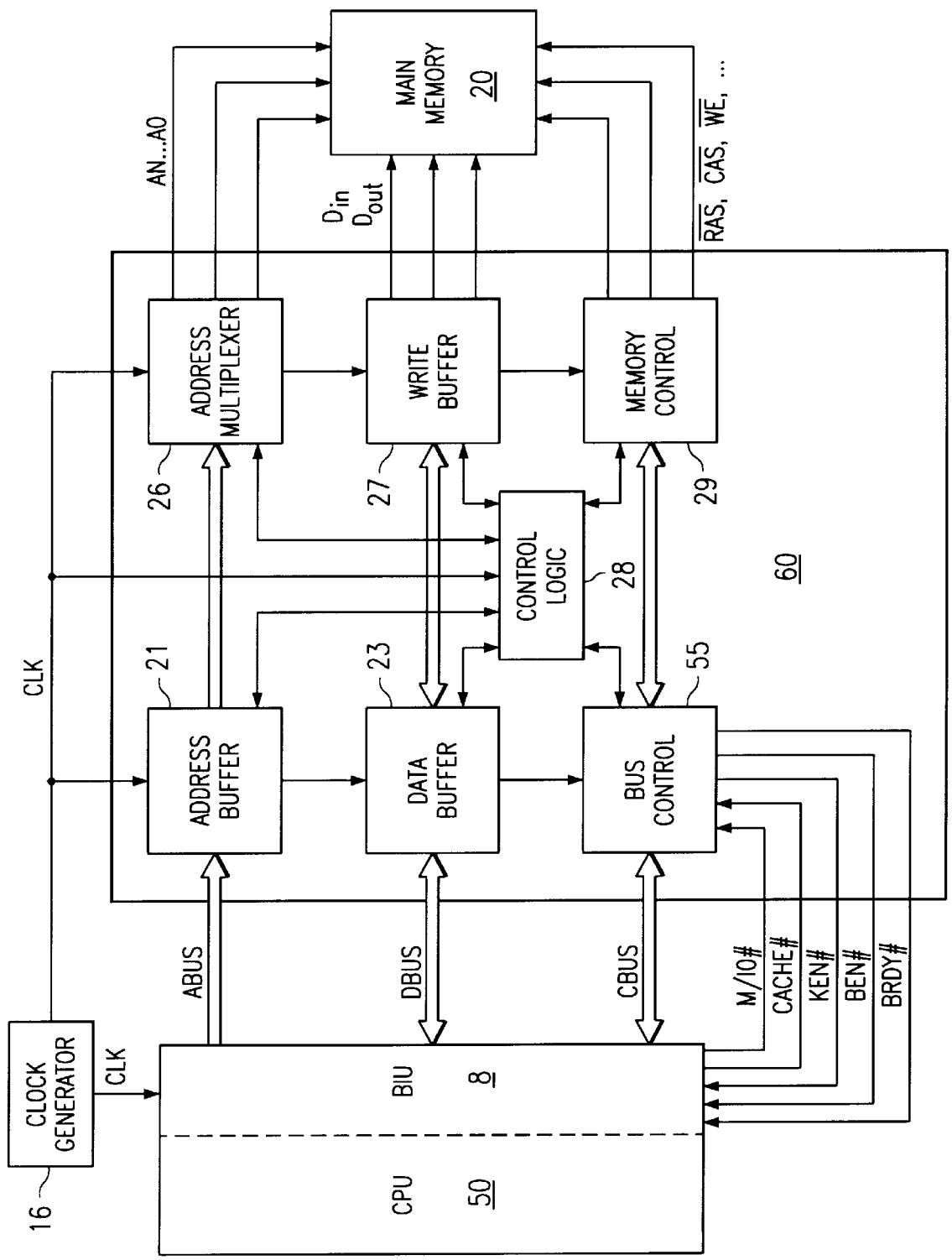
FIG. 5 is an electrical diagram of a second embodiment, in block form, of the memory and input/output controller of the system of FIG. 1.

If an additional microprocessor pin and corresponding mother board conductor are available, the various inventive aspects may be implemented according to a second embodiment, as is now described relative to FIG. 5. In FIG. 5, like reference numerals are used to refer to like elements as shown in FIG. 2.

FIG. 5 illustrates CPU 50, which is also a Pentium-class microprocessor as described above relative to FIG. 2, but which in this case is configured so that certain types of memory accesses imply a request for burstable access. These requests are communicated (either expressly or implicitly) to bus control logic 55 in memory controller 60, for interpretation as burst memory access requests.

For example, the execution of a block memory access operation by CPU 50, such as a REP MOV instruction, may set a control flag in BIU 8 that is communicated to bus control logic 55. In this event, once the control flag is set, bus control logic 55 may then interpret all subsequent memory access requests (line M/IO# high) as requests for burst access, for accesses both to cacheable and also non-cacheable areas of the memory address space. Alternatively, specific instructions may be executable by CPU 50 that explicitly refer to burst memory accesses both to cacheable and non-cacheable areas of memory; a flag or control signal would again be set by CPU 50 to indicate to memory controller 60 that a burst access is requested.

According to this second embodiment, because burst memory accesses may be requested by CPU 50 both to cacheable and non-cacheable areas of memory, separate indications of cacheability and burstability are preferably given by memory controller 60 to CPU 50. This is because CPU 50 may issue a implied burst access request while not knowing whether the memory address is in a cacheable area of the memory address space; even if the memory access is non-cacheable, burstable access will still be desirable. According to this embodiment, therefore, burst enable signal BEN# is provided, which is a signal and corresponding CPU terminal provided in this embodiment, in addition to the conventional Pentium-class control signals and pins. As shown in FIG. 5, according to this embodiment of the invention, bus control logic 55 issues a signal on line KEN# to indicate cacheability of the memory access (similarly as described hereinabove relative to the first embodiment of the invention), and also issues a signal on line BEN# to indicate whether or not burst access was granted. In the event that CPU 50 requested burst access to a non-cacheable memory location, line KEN# is maintained high by bus control logic 55 (indicating non-cacheable access) and line BEN# is driven low by bus control logic 55, indicating the grant of burstable access and thus instructing CPU 50 to either present or expect four quad-words of data on data bus DBUS.

Having described various aspects of the present embodiments directed to non-cacheable data, FIG. 6 illustrates a detailed schematic of yet an additional embodiment which may be included within CPU 5 of FIG. 1 or other CPUs, and which is directed to a configuration where the CPU may temporarily store and modify non-cacheable data for a certain time period. For example, under the present embodiments, it may be desirable to store and modify non-cacheable data for a time period greater than that used for the processing of single instruction. As another example, some instructions, such as the REP MOV instruction mentioned above, inherently suggest a repeated operation on a block of memory locations; however, other instructions may be in a loop where, single instructions in such a loop do not by themselves indicate a loop and, therefore do not represent an operation on a block of memory locations. For these latter types of instructions, it also may be desirable to store and modify non-cacheable data for a time period over a portion or all of the loop which contains these types of instructions. Thus, the following embodiment present circuits, systems, and methods to achieve such operation.

Turning then to FIG. 6, it illustrates BIU 8 discussed above and, again, coupled to the three buses DBUS, ABUS, and CBUS, as well as receiving the CLK signal from clock generator circuit 16. Below BIU 8, however, are numerous additional circuits which have not yet been discussed (other than L2 cache 6). Regarding these additional circuits, note first for purposes of simplicity that each of the DBUS, ABUS, and CBUS is shown connected, through BIU 8, to a common bus B. Thus, within microprocessor 5, it is intended that bus B may carry any of data, address, or control information. Bus B is connected to provide a DATA transaction unit to, or receive a DATA transaction unit from, a first register 62. In the present embodiment, the bus B transaction width is 8 bytes. Further, for purposes discussed below, in the preferred embodiment register 62 is sized to store up to one burst line of data; therefore, if the bus burst size is 32 bytes, then register 62 may store up to 32 data bytes. Note further, however, that in alternative embodiments register 62 may be larger or smaller than a single burst size of data. Bus B is further connected to provide an ADDRESS to, or receive an ADDRESS from, a second register 64, where that address corresponds to the DATA being read into, or written from, register 62.

Also associated with registers 62 and 64 are preferably three indicators 66, 67, and 68. Indicator 66 indicates whether the DATA in register 62 is alive or expired as those terms are understood below; therefore, indicator 66 is hereafter referred to as L/E indicator 66. Indicator 67 indicates whether the DATA in register 62 is clean or dirt and, therefore, hereafter is referred to as C/D indicator 67. The terms clean and dirty are used here in the same manner as in the cache art, thereby indicating whether DATA has been modified after being received in register 62. Moreover, recall from above that data register 62 is preferably sized to store 32 bytes of information. In alternative embodiments, therefore, C/D indictor 67 may be a single indicator for the entire set of DATA stored in register 62 or alternatively, may includes separate indications for each byte and, therefore, will include a total of 32 indicators, one for each of the 32 potential DATA bytes stored in register 62. Still further, C/D indictor 67 may include separate indications for other byte groupings, such as the bus transaction unit size of 8 bytes, or groups of 4 bytes or other groups as well. Indicator 68 indicates whether portions of the DATA are valid or invalid and, therefore, is referred to hereafter as a V/I indicator 68. The terms valid and invalid are also used in the manner of the cache art, that is, to indicate whether a given portion (e.g., a byte) of the DATA may be relied upon as valid information by a circuit reading that information. Again, recall from above that data register 62 is preferably sized to store 32 bytes of information. In this context, in the preferred embodiment, V/I indictor 68 preferably includes separate indications for each bus transaction size and, therefore, will include a total of four indicators, one for each of the 8 byte transaction units of DATA stored in register 62. However, as was the case for C/D indicator 67, in alternative embodiments indicator 67 may include separate indications for other byte groupings, such as groups of 4 bytes, individual bytes, or other groups as well. Each of indicators 66, 67, and 68 may be represented in various manners as known in the art, such as a bit in separate or common registers, a signal on a conductor, or a state in a state machine. The definition of the indications, that is alive or expired, valid or invalid, and dirty or clean, is further demonstrated below with respect to the operation of the circuits of FIG. 6.

L/E indicator 66 is connected to a L/E control and response circuit 70. More particularly, in the preferred embodiment, L/E control and response circuit 70 may write the state to L/E indicator 66 and, thereafter, may read that same value for purposes explained below. In addition, L/E control and response circuit 70 may receive an address from bus B, as well as the ADDRESS in register 64. Still further, L/E control and response circuit 70 is connected to receive a control signal from a counter 72. This control signal is asserted by counter 72 once it counts from a first value provided from an initial value register 74 to a final value provided from a threshold value register 76. Note that the values in registers 74 and 76 may be established in various manners, such as having them fixed values, or by having them programmable. If programmable, these values may be set at various levels, such as by the user or at a level below the user (e.g., operating system). With respect to counter 72, it may be constructed according to various known techniques to advance from its initial value to its threshold value. Further, note it is stated that the counter "advances", thereby intending to include a counter which either increments or decrements from a first value toward a second value. As detailed below, L/E control and response circuit 70 is operable to output a HIT/MISS signal which relates to the stored DATA, its ADDRESS, its L/E indication, and possibly the value of the count from counter 72. Lastly, note that L/E control and response circuit 70 may be constructed by a person skilled in the art using various known approaches given an understanding of its functionality and circuit relationships as discussed below.

The schematic of FIG. 6 further includes a C/D control and response circuit 78. More particularly, in the preferred embodiment, C/D control and response circuit 78 may write the state to C/D indicator 67 and V/I indicator 68, thereafter, may read those same values for purposes explained below. In addition, C/D control and response circuit 78 may read the DATA in register 62, and also provide control signals to both registers 62 and 64 to cause, under circumstances described below, the DATA and ADDRESS of those registers to be written to bus B. Still further, C/D control and response circuit 78 is connected to receive the above-discussed control signal from counter 72, and optionally also may be connected to read the value of the count from counter 72 as well as the initial and threshold values from registers 74 and 76, respectively. Lastly, note that C/D control and response circuit 78 may be constructed by a person skilled in the art using various known approaches given an understanding of its functionality and circuit relationships as discussed below.

Lastly, FIG. 6 further illustrates level 2 cache circuit 6. For reasons more clear below, level 2 cache circuit 6 is included to contrast the difference in storage techniques of the circuits of FIG. 6. Briefly, recall from above that main memory (e.g., see FIG. 3) may have storage space which is separated into cacheable and non-cacheable data. With respect to FIG. 6, portions of the cacheable data may be stored in level 2 cache circuit 6 (or some other cache structure). In contrast, portions of the non-cacheable data may be stored in data register 62. The techniques as well as the benefits from the latter storage are detailed below.

FIG. 7 illustrates a flowchart of a method 80 of various operational steps of the circuits of FIG. 6. Before detailing those steps, note first that the order of various steps in method 80 is by way of example, and a person skilled in the art may readily alter such order while still taking advantage of various inventive aspects provided by the present circuitry. In addition, various of the steps in FIG. 7 also may be performed concurrently during a common clock cycle rather than sequentially, but a sequential flow is presented to simplify the present discussion.

Turning to FIG. 7, method 80 begins with step 82 where CPU 5 reads DATA and a corresponding ADDRESS into registers 62 and 64, respectively. In the preferred embodiment, the DATA which is read is non-cacheable data. Moreover, this non-cacheable data is preferably a burst sequence of data. For example, recall above in connection with FIG. 4a that a technique is presented for reading a sequence of burstable, non-cacheable data. Thus, this technique or an alternative is performed to obtain successive quantities of non-cacheable data. Recall from FIG. 4a above that the example provided four quad words (each being 64 bits, or 8 bytes) and, therefore, the entire burst is 32 bytes. As stated above, DATA register 62 is preferably sized to store up to a burst sequence of DATA. Thus, after step 82, register 62 stores all 32 bytes of DATA. Recall also in connection with FIG. 4a that an address was issued on bus lines A31–A3 to address the burst sequence of data. Because this address corresponds to the DATA, it is stored as the ADDRESS in register 64. Note also that although the above is described as preferable with a burst sequence of DATA, note further in an alternative operation that less than a burst of DATA may be stored in register 62 (or more than a burst if register 62 is larger than a single burst size). Thus, it is stated above that register 62 is operable to store up to one burst line of data, yet it clearly may store less than a burst such as a only a single unit of data (e.g., 8 bytes). Lastly, as further borne out below, note further that once the first DATA arrives in register 62, counter 72 begins to advance. Moreover, if this DATA arrives as a burst, the count preferably begins advancing upon receipt of the first part of the burst, such as the first eight bytes.

Step 84 initializes the values of indicators 66, 67, and 68. Again, although this step is shown in FIG. 7 as following step 82, this is done simply to separate the present discussion. Thus, the following actions may occur during the same clock cycle as step 82, with the indicators set in response to new DATA being received by register 62. Turning now to the indicators, L/E indicator 66 is initialized to indicate that the newly received DATA in register 62 is live, again as explained in greater detail below. Moreover, in a manner similar to the meanings in the cache art, C/D indicator 67 is initialized to indicate that the newly received DATA in register 62 is clean and V/I indicator 68 is initialized to indicate that the newly received DATA in register 62 is valid. Note further that these settings may be accomplished by L/E control and response circuit 70 writing the new value to L/E indicator 66 and C/D control and response circuit 78 writing the new value to C/D indicator 67 and V/I indicator 68. Again, these two latter indications have the meaning typically used in the cache art. Therefore, with respect to C/D indicator 67, a clean indication represents that DATA in register 62 has been unchanged since it was read into register 62; conversely, an indication that the DATA is dirty represents that it has been changed since it was read into register 62 and, therefore, for coherency purposes, is the most current form of that DATA (i.e., the line of DATA acts in a "write back" manner as known in the art). With respect to V/I indicator 68, a valid indication represents that the DATA in register 62 may be read by circuits having access to that DATA; conversely, the same DATA should not be read if marked invalid.

Step 86 is directed to the start up procedure for counter 72, which again preferably occurs in parallel operation to steps 82 and 84, above. Specifically, during step 86, counter 72 reads an initial count value from register 74. For example, if counter 72 is an incrementing counter, the value in register 74 may be a zero. Indeed, note further as an alternative that counter 72 may include reset hardware which, when asserted, initializes the counter to a predetermined value without reading an initial value from a register or other storage device. After counter 72 is initialized, step 86 also begins advancing the count (again, by commencing the advancement after register 62 receives the DATA, or a first portion of that DATA). As mentioned above, the term "advancing" is used to suggest the counter may increase or decrease its count in accordance with the present embodiments. For example, if the initial value were zero as suggested above, the advancement of the count may be from zero, either upward (i.e., increment) or downward (i.e., decrement). On the other hand, if the initial value were some other number, the advancement of the count may be upward or downward from that value as well. Still further, note also that the threshold value could be fixed while the initial value were variable, such as in the case where an initial value was a positive number in a register, and counter 72 decremented to a threshold of zero. In this case, the threshold again may be fixed in counter 72 without the need for a separate storage device such as register 76. Indeed, still additional approaches may be contemplated by a person skilled in the art, but such alternatives may be more complicated to implement. Regardless of the advancement technique of counter 72, note further that the count is responsive to an activity over time. For example, in the embodiment described above, counter 72 advances in response to each clock cycle where that clock cycle is provided by, or derived from, clock generator 16. Specifically, as is known in the microprocessor art, CPU 5 typically includes a core which operates at one clock speed, and a main bus which may operate at a different clock speed. These clock cycles either match, or are derived from (either directly or as a multiple of), the clock cycles from clock generator 16. In any event, given the microprocessor clock time of the execution stage, counter 72 preferably advances in response to each such clock cycle. As an alternative embodiment, however, counter 72 could advance in response to some other signal which occurs over time after the DATA is read into register 62 and the count is initialized. For example, counter 72 may advance each time a transaction occurs over the DBUS (which is included within bus B in FIG. 6). Thus, for those clock cycles where no data is present on the DBUS, counter 72 does not advance, whereas for those clock cycles where data is present on the DBUS, counter 72 advances once in response to each such cycle. Still other advancement techniques may be ascertained by a person skilled in the art.

Step 88 causes a waiting operating based on the advancing count of counter 72. More specifically, step 88 continuously evaluates whether the count of counter 72 is less than the threshold value in register 76. If not, the flow returns to step 88 to continue the evaluation. Once the count reaches the threshold, however, method 80 continues to step 90. Note also that step 88 indicates that the inquiry is based on a "less than" condition which, of course, could be changed to less than or equal to such that the flow continued to step 90 only once the count exceed the threshold. In either event, it may be stated that the flow continues to step 90 once the count reaches some threshold value, where the threshold is the value in register 76 if the less than condition is used, or the threshold is the value in register 76 plus one if the less than or equal to condition is used.

Step 90, having been reached once the count of counter 72 reaches the threshold in register 76, changes the state of L/E indicator 66 from live to expired. Again, this operation may be accomplished by L/E control and response circuit 70 writing the new value to L/E indicator 66. Given the operation thus far, note further that between steps 84 and 90 the storage of the DATA and ADDRESS provides a cache-like storage for what is otherwise non-cacheable data. Specifically, before the count reaches the threshold, indicator 66 indicates that the DATA is live. This indication indicates to any requesting circuit that it is permissible during the live status to either read or write the DATA in register 62. Of course, this indication is also to be viewed in light of the two other indicators 67 and 68. For example, assume that an entire burst of DATA is stored in register 62 (i.e., indicator 68 indicates valid), that the count has not reached its threshold (i.e., indicator 66 indicates live), and the DATA has not been modified since it was received (i.e., indicator 67 indicates clean). Thus, like a cache configuration, an address placed on bus B and seeking to read corresponding data may address the DATA in register 62. More specifically, such an address is received by L/E control and response circuit 70. Circuit 70 then determines if the address on bus B matches the ADDRESS in register 64 and whether the DATA is live and valid; if these conditions are met then circuit 70 issues a HIT in the manner of a cache circuit. Thus, in response to the HIT signal, the circuit which issued the ADDRESS may then read the DATA from register 62. Moreover, in a similar regard, note also that a snoop address also may be received by circuit 70 in a like manner. As known in the art, snooping permits cache structures to maintain proper memory coherency. Again, therefore, circuit 70 may compare the snoop address to the ADDRESS in register 64, and issue a HIT if the corresponding DATA is live and valid. Still further, if the snoop request further requests a cast out operation, the corresponding DATA may then be written to bus B as well and, therefore, be available in response to the snoop. In this event, C/D indicator 67 also would be set to clean since the copy of DATA in register 62 is therefore no longer the only copy of that information. As yet another example, the snoop request may, in addition to requesting a cast out of the DATA, also may request an invalidate. Thus, in addition to outputting the DATA, V/I indicator 68 would be set to invalid. These as well as other snoop techniques may therefore be included, and such techniques are known in the art such as demonstrated by Section 8.3 of the text "Computer Architecture A Quantitative Approach", second edition, by Hennessy and Patterson, 1996, publisher Morgan Kaufmann Publishers, Inc., where that section is entitled "Centralized Shared-Memory Architectures," and which is hereby incorporated herein by reference.

In addition to the above, due to the described cache-like operation, note further that while the DATA in register 62 is live, it also may be modified again in a manner similar to the cache art. Thus, if an address seeking to write information is placed on bus B, circuit 70 again determines whether that address matches; the ADDRESS in register 64 and, if so, further determines whether the DATA in register 62 is live. If so, the DATA in register 62 may be modified. Moreover, in such an event, circuit 78 detects the change to the DATA and changes the state of C/D indicator 67 from clean to dirty. These as well as other cache-like operations also may be included with the present embodiments, and again are ascertainable from various references, such as the above-cited and incorporated by reference text entitled "Computer Architecture A Quantitative Approach".

While the immediately two preceding paragraphs described a cache-like operation for selected circuits of FIG. 6, note further that this operation has a "life span" as defined by the count in counter 72. Specifically, during step 90, the DATA is marked expired and, therefore, after that action circuit 70 will always indicate a miss. In other words, even if an address (either a bus address for a read or write from bus B, or a snoop address) is issued to circuit 70 and matches the address in register 64, circuit 70 will detect that the DATA is expired because the count in counter 72 reached its corresponding threshold. Thus, only during the "life span" between the initial count and up to the threshold count is the DATA available in a cache-like manner. Note further, however, that this operation is only stated to be cache-like due to those of its operations which are similar to those of typical cache structures. However, because the DATA is by definition non-cacheable (as indicated from the main memory), it is not presented to another cache structure such as level 2 cache 6 or other caches within or external from CPU 5.

Turning next to step 92, it determines whether C/D indicator 67 is clean or dirty as corresponding to valid DATA. If the indicator states the DATA in register 62 is clean (and which is also valid), method 80 continues to step 96. On the other hand, if C/D indicator 67 indicates that the DATA in register 62 is dirty, then during step 94 circuit 78 issues appropriate control signals so that the DATA in register 62 is written to main memory (or some other higher level storage structure), according to the ADDRESS stored in register 64, thereby ensuring proper memory coherency. Note further that step 92 may be changed or eliminated in alternative embodiments. For example, while method 80 illustrates that dirty DATA is written to main memory only after the count reaches its threshold, note further that C/D control and response circuit 78 also may read the initial value, the threshold value, and the count at any time. Thus, based on these values, circuit 78 may evaluate the C/D indicator 67 before the count reaches the threshold value and, if the DATA is dirty, issue appropriate control signals to cause the DATA to be written to main memory before the count reaches the threshold. Thus, periodic updates could be made to main memory based on some averaging or the like of time between the initial and threshold values of the count. As another example of a modification to the above, the notion of writing dirty information back to a higher storage arises in the context of what is referred to in the art as a writeback approach, that is, an approach where data is initially written to a cache (or cache-like) structure, and is later output to update a higher level memory structure. In an alternative embodiment, therefore, the known write through methodology may be used. In such an event, each time a modification is made to already-stored DATA in register 62, it is also written to main memory. In such an event, there is no need to have a dirty versus clean indicator because, by definition, the DATA is always clean (because it is always a copy of the same information available in a higher level memory). Indeed, given the alternative of writeback and write through, still another approach of the present embodiment is to make the choice dynamically alterable. For example, an enable signal could be used. In such an event, when the signal is in a first state, DATA is written in a writeback manner, thereby requiring maintenance of, and adherence to the representation of, C/D indicator 67 with respect to that DATA. Conversely, when the signal is in a second state, DATA is written in a write through manner, thereby eliminating the need to maintain or respond to the representation of C/D indicator 67 with respect to that DATA. Lastly, once a proper technique is used to ensure memory coherency due to a modification of the DATA in register 62, method 80 continues to step 96.

Step 96 merely indicates an end to the flow for the particular instance of DATA and its corresponding ADDRESS. However, after step 96, method 80 may repeat with respect to different non-cacheable DATA written to register 62, and then repeat the steps of method 80 in the manner described above.

Figure 8:
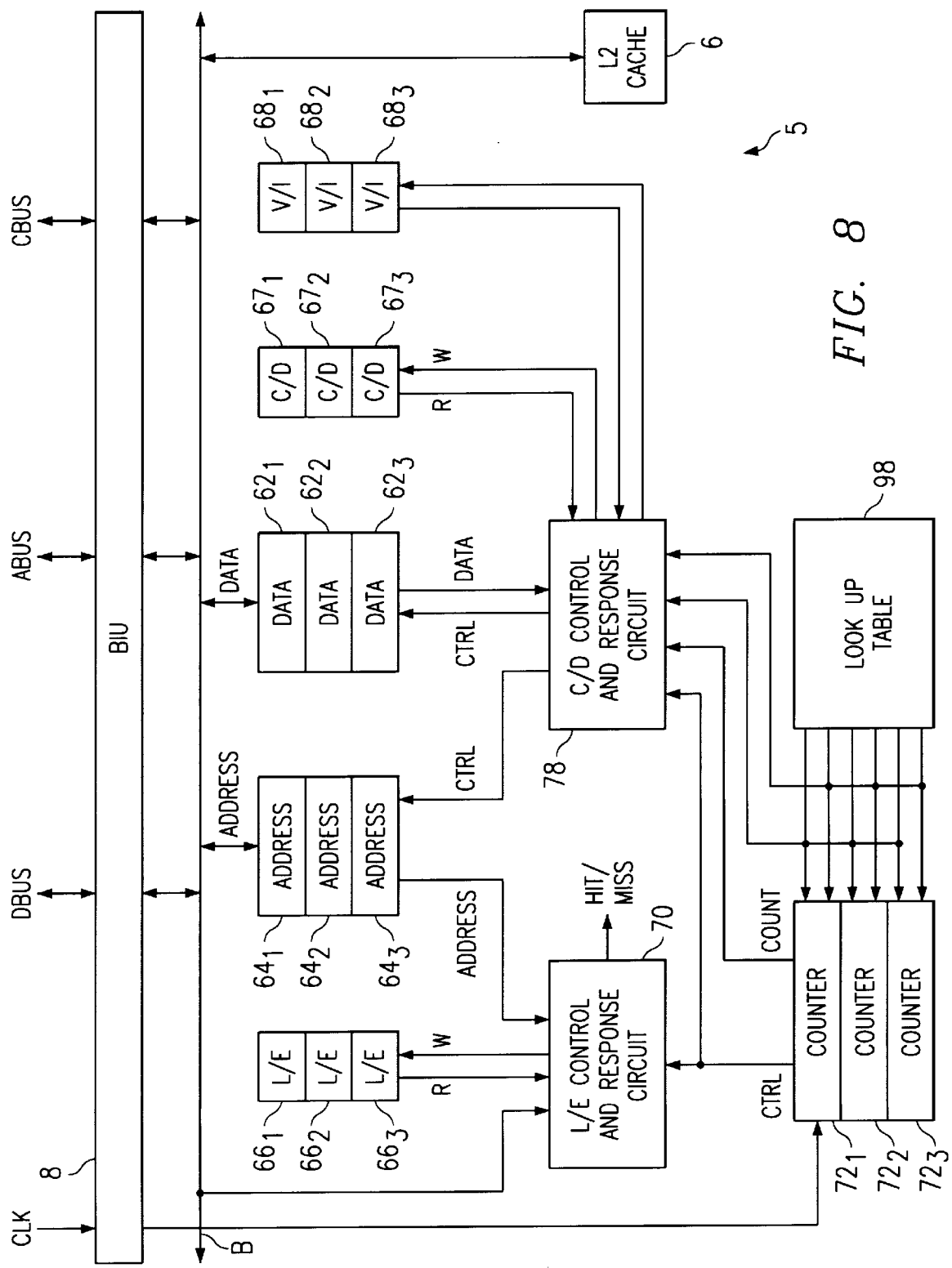
FIG. 8 is a schematic of an embodiment for storing a plurality of lines of non-cacheable data and corresponding addresses, where each line may be read and written by the CPU and modified during a life span as determined by a corresponding counter.

FIG. 8 illustrates an alternative embodiment to FIG. 6 where many of the same concepts are carried forward yet are duplicated to store numerous independent sets of DATA and ADDRESSES. Thus, to simplify the common aspects of FIGS. 6 and 7, like reference numerals are carried forward in most instances, but subscripts are added or reference numbers are changed to distinguish those changed features, each of which is discussed below.

The implementation of FIG. 8 allows storage of three different lines of DATA in corresponding registers $62_1$, $62_2$, and $62_3$. Each of these lines is again preferably operable to store up to one burst line of data (e.g., 32 bytes). Moreover, each line of DATA has a corresponding ADDRESS stored in a respective register $64_1$, $64_2$, and $64_3$. Indeed, note that where multiple storage units are used such as depicted in FIG. 8, one approach is to use existing microprocessor storage circuits. For example, often a microprocessor includes a prefetch buffer which includes the capability to store lines of data and corresponding addresses. Thus, one technique for implementing the multiple data and address registers of FIG. 8 is to share the prefetch buffer responsibility with the operation described in this document. In other words, an enable signal could be associated with each storage line. When the enable signal is in a first state, the line operates according to the predetermined prefetch function of the microprocessor. However, when the enable signal is in a second state, the line operates according to the present embodiments. For more information about an inventive prefetch buffer arrangement, the reader is invited to review U.S. Provisional Patent Application No. 60/024,860 (Attorney docket number TI-18851P), entitled "Microprocessor Circuit, Systems, And Methods Using A Combined Writeback Queue And Victim Cache", filed Aug. 28, 1996, now U.S. patent application Ser. No. 08/919,732 filed Aug. 28, 1997, which is hereby incorporated herein by reference.

Returning to each line of information provided by FIG. 8 in the sense of the present embodiments, each such line further includes a corresponding L/E indicator $66_1$, $66_2$, and $66_3$, a corresponding C/D indicator $67_1$, $67_2$, and $67_3$, and a corresponding V/I indicator $68_1$, $68_2$, and $68_3$. Each of the above registers and indicators are again connected to control circuits, those including L/E control and response circuit 70 and C/D control and response circuit 78. In this instance, however, circuits 70 and 78 include additional hardware to accommodate the plurality of independent data and address lines as well as their corresponding indicators. Lastly, each line also has a corresponding counter $72_1$, $72_2$, and $72_3$, respectively. With respect to the counters, however, note that in lieu of initial and threshold value registers 74 and 76, the counters have access to a look up table 98. Each entry in the look up table includes an address, and both a corresponding initial value and threshold value. The look up functionality of table 98 is further detailed below.

The operation of the circuit of FIG. 8 is generally the same as method 80 of FIG. 7 discussed above. However, the same steps set forth above with respect to method 80 are preferably independently carried out with respect to each different line (i.e., DATA, as well as its corresponding ADDRESS, indicators, and counter). Thus, the reader is referred to the above discussion of FIG. 7 for an extensive description. At this point, one skilled in the art will appreciate that, for each line of DATA and corresponding ADDRESS, a life span is associated with that line due to the corresponding count, and during the life span the DATA may be read or written and memory coherency is ensured either during or at the end of that life span. The only other difference arises in the context of look up table 98 and, therefore, this concept is addressed immediately below.

Look up table 98 is accessed in connection with step 84 from FIG. 7. Recall that step 84 initializes the values of indicators 66 and 67, and it is shown above how such a process may occur in connection with registers 74 and 76. In the alternative embodiment of FIG. 8, which also may be implemented for a single line implementation such as in FIG. 6, look up table 98 provides the initial and threshold values for each respective counter $72_1$ through $72_3$. More specifically, each time an ADDRESS is received in a register 64, that ADDRESS is searched in look up table 98. Provided the ADDRESS is then located in table 98, a corresponding entry is also found for both the initial and threshold values to be associated with the corresponding DATA in a register 62. If the ADDRESS is not found, then predetermined default values may be used for both the initial and threshold values, or an error may occur. Given this implementation, therefore, the values in look up table 98 may be fixed, programmed and/or dynamically altered so that they differ for one group of addressable DATA over another. Still further, while look up table 98 is shown as having both an initial and threshold value for each address, as mentioned above, either of these values may be hardwired such as a reset to an initial value or a fixed threshold of zero and a decrement to that fixed threshold. Thus, if one of the two values is fixed, such a value need not be located in look up table 98; in that case, therefore, table 98 would only store the non-fixed value corresponding to each address.

Given the above aspects of FIGS. 6 through 8, it is also instructive to demonstrate an example of use of those aspects in a system context. In that regard, note that often in graphics processing an autonomous process is accomplished by circuitry independent of the CPU on bit map data stored in a video frame buffer or the like. Thus, this graphics process is frequently changing data and, therefore, that data is marked as non-cacheable due to what otherwise would be a risk of the data being changed by the independent graphics accelerator while also stored in a cache on CPU 5. Given the embodiments of FIGS. 6 through 8 above, however, note now that the life span of the DATA may be limited to minimize such a risk. For example, suppose that it is empirically determined that the autonomous process will change data only every 64 clock cycles. In this case, the threshold value stored to a threshold register 76 (or an entry in look up table 98) could be established at a value less than 64 clock cycles. As a result, even though this bit map frame buffer non-cacheable data were stored within register 62, any modification to it would have to happen during its life span and, therefore, would likely occur before the same data were changed by the autonomous graphics process. Moreover, during this life span, the data is also available simply for read purposes by CPU 5 without having to access main memory and, therefore, without having to incur the delay which would be required for such an access. Thus, clear advantages are provided over the prior art where such access would be required. Moreover, this is but one of many examples of use for the present embodiments, others of which will be ascertainable by a person skilled in the art.

Figure 9:
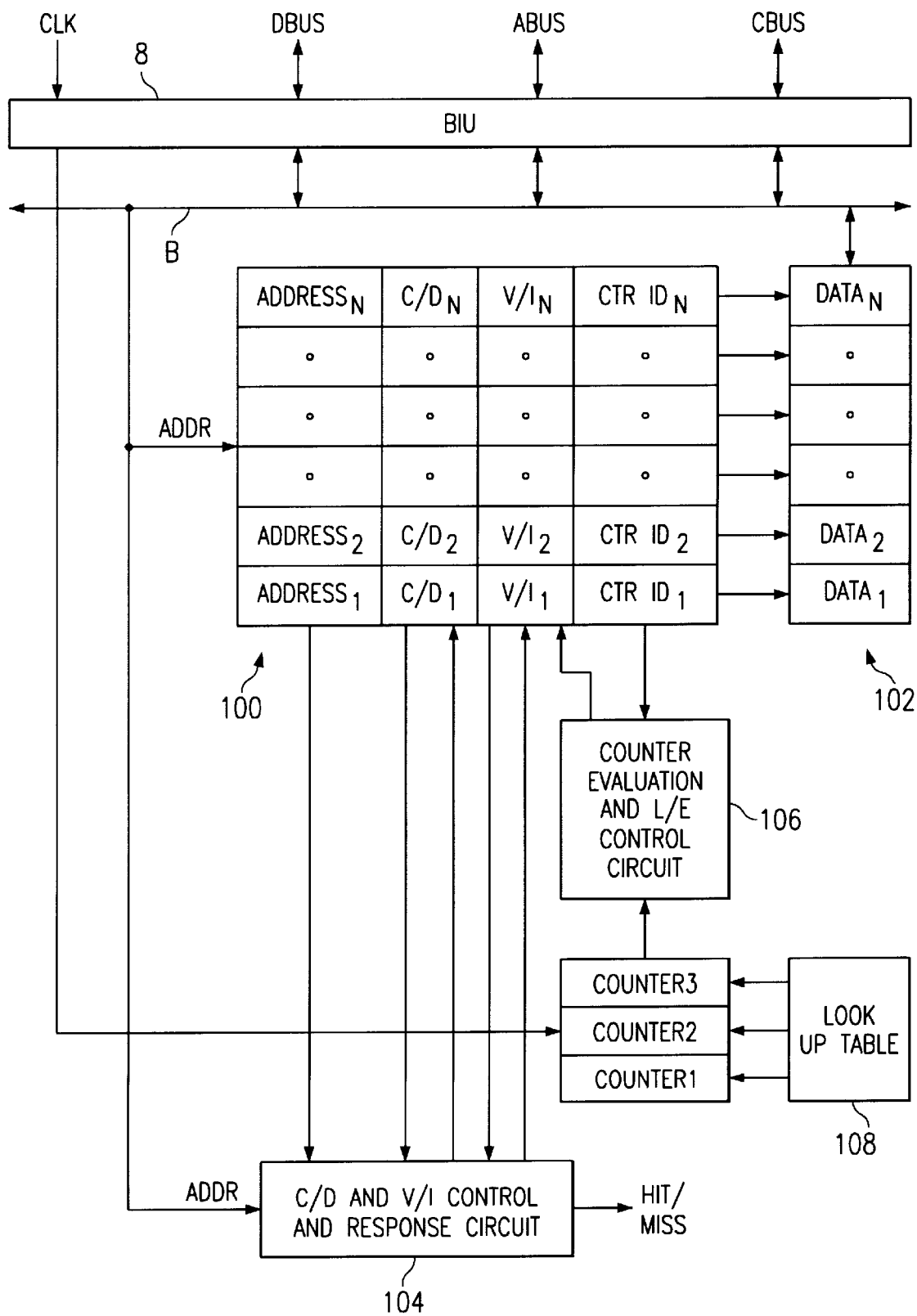
FIG. 9 is a schematic of an embodiment for storing a plurality of lines of data and corresponding addresses, where some of the lines are governed by known cache policies while others may be read and written by the CPU and modified during a life span as determined by a counter identified by the tag for the line.

FIG. 9 illustrates an alternative embodiment to FIG. 6 where various of the above-discussed concepts are carried forward with additional modifications within the inventive scope. Thus, again there is designated generally a microprocessor 5 having a BIU 8 receiving three external bus signals (i.e., DBUS, ABUS, and CBUS) as well as a CLK signal. Again for simplicity each of the DBUS, ABUS, and CBUS is shown connected through BIU 8 to a common bus B. As an introductory matter, note that the embodiment of FIG. 9 demonstrates how various of the present inventive concepts may be further combined by modifying an existing cache structure. For example, the circuits shown below bus B in FIG. 9 may be included with, or associated with, a cache structure such as L2 cache 6 shown in various of the above Figures. By associating the present embodiment with an existing cache, design complexity is minimized with such an approach, as may be the data path since a separate data path need not be constructed to a structure which is completely independent of an existing cache. Given this introduction, the discussion below describes the various circuits and well as their relationship to both the present embodiments as well as current cache structures.

The circuits of FIG. 9 include a tag memory 100 and as associated data memory 102. In general, the association of a tag memory and data memory is known in the art, whereby the tag memory stores information regarding a corresponding entry in the data memory. Tag memory 100 and data memory 102 have a corresponding number of rows, illustrated as an integer N in FIG. 9. With respect to tag memory 100, each of its rows includes three portions as known in the art and may include other as well. With respect to the three known portions shown, tag memory 100 includes an ADDRESS of the corresponding data in data memory 102, an indicator of whether the corresponding data is clean or dirty (i.e., shown as a C/D indicator), and an indicator of whether the corresponding data is valid or invalid (i.e., shown as a V/I indicator). As with the above embodiments, the indicators may be represented by a signal or bit, and may be for an entire width of a data entry or include multiple indicators for parts of the data entry (e.g., per byte, multiple bytes, burst size, and so forth). Lastly, in order to provide an appropriate HIT/MISS signal as demonstrated below, the ADDRESSEes from tag memory 100 may be read, and each of the C/D indicators and V/I indicators may be both read and written by a C/D and V/I control and response circuit 104.

In addition to the known elements of tag memory 100, it also includes at least two other aspects thereby creating a system within the present inventive embodiments. As a first aspect, in addition to indicating validity for purposes known in the art, each V/I indicator may be also be set to invalid in response to a counter evaluation and L/E control circuit 106. As better appreciated below, therefore, when the life span, if any, for the data corresponding to the tag memory entry reaches its threshold, the V/I indicator is set to invalid. As a second aspect, a number of rows in tag memory 100, which in the preferred embodiment includes all N rows, includes a counter identification portion (abbreviated CTR ID) in addition to the other three portions described above. The detailed functionality of the CTR ID indicators is described below.

Completing the remaining connections of FIG. 9, it includes a plurality of counters which, in the example of FIG. 9, is three counters designated COUNTER1 through COUNTER3. Note that the number of counters may vary, but in the present embodiment are preferably considerably less than the N number of rows in data memory 100. Each of the COUNTERs is connected to receive the CLK signal so as to count successive clock cycles as in the embodiments of FIGS. 6 through 8, above. Alternatively, however, as mentioned above, one or more of the COUNTERs may be connected to count some other successive event, such as bus transactions or other events ascertainable by a person skilled in the art. Each of the COUNTERs is also connected to a look up table 108 which performs the same functionality as described in connection with look up table 98 of FIG. 8, above. Thus, one skilled in the art will appreciate that look up table 108 provides either or both of an initial value and a threshold to each respective COUNTER in response to the ADDRESS of the DATA, thereby defining the life span of the DATA associated with the COUNTER as described below. Moreover, recall from the above discussions that the present embodiments contemplate alternatives to a look up table input for each COUNTER, such as a fixed value for either or both of the initial and threshold values, where that fixed value may be hard-wired to the counter or supplied from a register or the like.

The operation of the circuits of FIG. 9 share some commonality with various of the embodiments described in connection with earlier Figures and, therefore, the reader is assumed to have an understanding of the earlier-described embodiments such that some of the detail need not be re-stated below. In a first sense, tag memory 100 and data memory 102 operate according to known technology. Therefore, an ADDRESS on bus B is connected to tag memory 100 and, provided that the ADDRESS matches an ADDRESS in tag memory 100 corresponding to valid DATA, C/D and V/I control and response circuit 104 outputs a HIT signal from which the appropriate action may be taken (i.e., depending on the request corresponding to the ADDRESS, such as reading the DATA, updating the DATA, or responding to some type of snoop).

In addition to the known functionality of tag memory 100, note that the embodiments of FIG. 9 further include inventive operation permitting a life span to be associated with DATA in data memory 102. Specifically, recall that each row in tag memory 100 includes a CTR ID. Note now that a CTR ID for a given row is operable to store an identification of any one of COUNTER1 through COUNTER3, and such an identification causes the identified COUNTER to correspond to the DATA for that row. For example, assume that CTR $ID_1$, which corresponds to $DATA_1$, identifies COUNTER2. Therefore, COUNTER2 provides a life span as introduced above with respect to $DATA_1$. Thus, so long as the count from COUNTER2 has not reached its threshold, $DATA_1$ is not expired. Note also that the CTR ID embodiment of FIG. 9 also permits more than one row of DATA to be associated with the same counter. Thus, assuming the same example provided immediately above (i.e., CTR $ID_1$ identifies COUNTER2), assume that CTR $ID_2$ also identifies COUNTER2. Thus, so long as COUNTER2 has not reached its threshold, both $DATA_1$ and $DATA_2$ have not expired. Still further, because more than one row may associate with the same COUNTER, note further that, as mentioned above, the FIG. 9 embodiment permits the number of COUNTERs to be less than the N number of rows in tag memory 100.

In addition to the life span functionality of the embodiments of FIG. 9, note further that the CTR ID, or some alternative indication such as a separate bit or signal different than the CTR ID, further permits a given row to indicate that the row is not associated with any counter. In other words, if a row is designated as not associated with a COUNTER, then the DATA for that row is to be treated according to the otherwise existing cache policies and is not governed by a life span. For example, in the preferred embodiment, the encoding of each CTR ID may be such that for one given code, it indicates that no COUNTER is associated with the corresponding line whereas each other code identifies one of the COUNTERs. In the present example, assume that the CTR ID is a 2 bit signal. Thus, the encoding of the signal may as shown in the following Table 2:

TABLE 2

| CTR ID value | COUNTER identified |
| --- | --- |
| 00 | No COUNTER |
| 01 | COUNTER1 |
| 10 | COUNTER2 |
| 11 | COUNTER3 |

From Table 2, therefore, one skilled in the art will appreciate that a CTR ID equal to 00 indicates that the corresponding line of DATA in data memory 102 is to be treated given the cache architecture and policies, and without regard for a life span of the corresponding DATA. Thus, such a line or line(s) will store cacheable data rather than non-cacheable data. On the other hand, if a CTR ID is equal to any non-zero combination of the 2 bits, a COUNTER is associated with the DATA so there is the required condition to determine whether the DATA is alive or expired. Lastly, note further that while Table 2 depicts that a non-zero value in the CTR ID correlates a line of data to a single COUNTER, in an alternative embodiment an indication could be provided to indicate a condition based on more than one COUNTER. For example, if three bits were used for the CTR ID rather than two, one or more of the three bit combinations could indicate a condition based on multiple COUNTERs. For example, the condition could be that circuit 104 does note indicate the corresponding data is expired until both of the identified COUNTERs have reached their corresponding thresholds. Still other examples will be ascertainable by a person skilled in the art.

Note that the configuration of FIG. 9 as well as its operation gives rise to yet another alternative aspect, namely, in connection with the indication of whether data is alive or expired. Recall that the embodiments of FIGS. 6 and 8 include an L/E indicator which is separate and independent from a V/I indicator for each line. However, as an alternative, note in the embodiment of FIG. 9 that a separate and independent V/I indicator is not provided for each line. Instead, counter evaluation and L/E control circuit 106 is connected so that it may modify the V/I indicator for each line of tag memory 102. As a result, once the count in a counter expires, rather than setting a separate L/E indicator to expired, counter evaluation and L/E circuit 106 sets the V/I indicator for that line to invalid. Like the above embodiments, upon this event it is also determined whether the corresponding data is dirty (i.e., by its corresponding C/D indicator) and, if so, the dirty data is written to some higher level of storage so as to ensure proper memory coherency. In any event, because there is not a separate L/E indicator, the V/I indicator not only indicates whether the corresponding data is valid according to known cache policy, but may further designate the data as invalid to an expired count. Consequently, because an invalid state of a V/I indicator in known cache technology indicates that data is no longer valid, note therefore that expired DATA is thereafter treated as invalid and, hence, the expired data will not be relied upon by a circuit seeking that information from data memory 102. Given this functionality, one skilled in the art will further appreciate that counter evaluation and L/E control circuit 106 includes sufficient circuitry to monitor each of the COUNTERs as well as the non-zero values of each CTR ID. Thus, when a COUNTER reaches its threshold, then the DATA for each line identifying that COUNTER via its CTR ID will be invalidated, that is, the V/I indicator corresponding to each such line will be set by circuit 106 to invalid. As an example, recall from above the example where both CTR $ID_1$ and CTR $ID_2$ both identify COUNTER2. Given that example, counter evaluation and L/E control circuit 106 will detect when COUNTER2 reaches its threshold. In response to that event, counter evaluation and L/E control circuit 106 will set both $V/I_1$ and $V/I_2$ to invalid. Lastly, note that this alternative of eliminating a separate and independent L/E indicator permits data which still has a live count to otherwise be marked as invalid. For example, if a given line of DATA corresponds to a COUNTER which is advancing to, but has not reached, a threshold, while a snoop and invalidate is received by tag memory 100, then the line will be set to invalid by C/D and V/I control and response circuit 104 even though the COUNTER has not yet reached its threshold. In contrast, a separate L/E indication such as in FIGS. 6 and 8 will not permit such an event and therefore provides a separate indication of a count which has not reached its threshold. Thus, any of the embodiments herein may use either alternative, that is, either an L/E indicator separate and independent from the V/I indicator, or a single V/I indicator which operates according to known cache policies, but which additionally identifies data as invalid if the life span of that data has reached its threshold.

From the above, it may be appreciated that the above embodiments permit storage of non-cacheable data into a cache-like structure for a certain life span of that data, and this structure may be independent of, or merged with, an existing cache structure. In either event, the life spanned data may be read and modified during this time without having to seek it from main memory. Moreover, the threshold of the life span may be adjusted to accommodate different circumstances to minimize or eliminate the possibility of active operations on two different versions of data corresponding to the same address. In addition, while the present embodiments have been described in detail, various substitutions, modifications or alterations could be made to the descriptions set forth above without departing from the inventive scope. Numerous such examples are presented above. As still another example, note that various principles in this document may be practiced independent of others. For example, the life span concept of FIGS. 6 through 9 may apply to processors using techniques differing from those in FIGS. 1 through 5. Still other examples are ascertainable by a person skilled in the art. Thus, the above benefits as well as the flexibility of the various examples set forth above demonstrate the many aspects of the present embodiments, which are defined by the following claims.

What is claimed is:

1. A microprocessor for coupling to an external read/write memory having an addressable storage space for storing cacheable data and non-cacheable data, said microprocessor comprising:
   a data storage circuit for storing a portion of said non-cacheable data;
   an address storage circuit for storing an address corresponding to said portion of said non-cacheable data;
   a counter for advancing a count from an initial value toward a threshold in response to an activity over time;
   an indicator for indicating said portion of said non-cacheable data in said data storage circuit is expired in response to said count reaching a threshold;

a data bus selectively connectable to said data storage circuit enabling data transfers;

an address bus carrying an address for data transfer; and a response circuit connected to said data storage circuit, said address storage circuit, said indicator and said address bus, said response circuit generating a hit signal when an address on said address bus matches said address stored in said address storage circuit and said indicator does not indicate said portion of said non-cacheable data in said data storage circuit has expired and otherwise generating a miss signal, said hit signal enabling said data storage circuit to supply data stored therein to said data bus in response to a data read operation.

2. The microprocessor of claim 1 wherein:

said hit signal of said response circuit further enabling said data storage circuit to store therein data on said data bus in response to a data write operation; and further comprising a clean/dirty indicator for indicating said portion of said non-cacheable data in said data storage circuit has been modified by a data write operation after being stored in said data storage circuit.

3. The microprocessor of claim 2 and further comprising:

circuitry for evaluating said clean/dirty indicator; and circuitry for writing said non-cacheable data to said addressable storage space in response to said circuitry for evaluating detecting that said clean/dirty indicator has changed from a clean state to a dirty state.

4. The microprocessor of claim 3 wherein said circuitry for evaluating said clean/dirty indicator evaluates said clean/dirty indicator in response to said count reaching said threshold.

5. The microprocessor of claim 3 wherein said circuitry for evaluating said clean/dirty indicator evaluates said clean/dirty indicator before said count reaches said threshold.

6. The microprocessor of claim 1 wherein:

said hit signal of said response circuit further enabling said data storage circuit to store therein data on said data bus in response to a data write operation; and further comprising circuitry for writing said non-cacheable data to said addressable storage space in response to said non-cacheable data being changed by a data write operation while stored in said data storage circuit and prior to said count reaching said threshold.

7. The microprocessor of claim 1 and further comprising a register location for storing said threshold.

8. The microprocessor of claim 7 wherein said threshold stored in said register is set by a program.

9. The microprocessor of claim 1 and further comprising a register location for storing said initial value.

10. The microprocessor of claim 9 wherein said initial value stored in said register is set by a program.

11. The microprocessor of claim 1 and further comprising:

a look up table for storing a plurality of values;

circuitry for consulting said look up table in response to said address in said address storage circuit, wherein said address corresponds to one of said plurality of values; and circuitry for selecting said one of said plurality of values as said threshold.

12. The microprocessor of claim 1 and further comprising:

a look up table for storing a plurality of values;

circuitry for consulting said look up table in response to said address in said address storage circuit, wherein said address corresponds to one of said plurality of values; and circuitry for selecting said one of said plurality of values as said initial value.

13. The microprocessor of claim 1 and further comprising:

a look up table for storing a plurality of values;

circuitry for consulting said look up table in response to said address in said address storage circuit, wherein said address corresponds to one of said plurality of values;

circuitry for selecting said one of said plurality of values as said threshold; and circuitry for selecting said one of said plurality of values as said initial value.

14. The microprocessor of claim 1:

wherein said portion of said cacheable data comprises a first portion of said cacheable data;

wherein said address corresponding to said portion of said non-cacheable data comprises a first address corresponding to said first portion of said non-cacheable data;

wherein said counter comprises a first counter for advancing a first count from a first initial value toward a first threshold in response to a first activity over time;

wherein said indicator for indicating said portion of said non-cacheable data in said data storage circuit is expired comprises a first indicator;

and further comprising:

a third storage circuit for storing a second portion of said non-cacheable data;

a fourth storage circuit for storing a second address corresponding to said second portion of said non-cacheable data;

a second counter for advancing a second count from a second initial value toward a second threshold in response to an activity over time, wherein said counter initiates said advancing in response to said third storage circuit receiving said second portion of said non-cacheable data;

a second indicator for indicating said second portion of said non-cacheable data in said third storage circuit is expired in response to said second count reaching said second threshold.

15. The microprocessor of claim 1:

wherein said microprocessor further comprises a core operating in response to successive clock cycles; and wherein said activity over time constitutes successive ones of said clock cycles such that said counter advances in response to each one of said successive clock cycles.

16. The microprocessor of claim 1:

wherein said data storage circuit is connected to a bus for receiving said portion of said non-cacheable data;

wherein said bus is operable to conduct a bus transaction during a bus cycle; and wherein said activity over time constitutes said bus transactions such that said counter advances in response to each one of said bus transactions.

17. The microprocessor of claim 1 and further comprising a cache circuit for storing a portion of said cacheable data.

18. The microprocessor of claim 1 wherein said indicator for indicating said portion of said non-cacheable data in said data storage circuit is expired in response to said count reaching a threshold further indicates whether said portion of said non-cacheable data in said data storage circuit is valid or invalid.

19. The microprocessor of claim 1 and further comprising a counter identifier for indicating that said counter corresponds to said non-cacheable data such that when said count reaches said threshold said indicator indicates said portion of said non-cacheable data in said storage circuit is expired.

20. A microprocessor for coupling to an external read/write memory having an addressable storage space for storing cacheable data and non-cacheable data, said microprocessor comprising:

a plurality of data storage lines, wherein at least one of said plurality of data storage lines is for storing a portion of said cacheable data and wherein at least one of said plurality of data storage lines is for storing said portion of non-cacheable data;

a plurality of address storage lines, wherein each of said plurality of address storage lines is for storing an address of data in a corresponding one of said plurality of data storage lines;

a plurality of counters, wherein each of said plurality of counters is for advancing a count from an initial value toward a threshold in response to an activity over time;

a plurality of indicators, each of said plurality of indicators corresponding to one of said plurality of data storage lines for storing said portion of non-cacheable data indicating said portion of said non-cacheable data in said data storage lines is expired in response to a corresponding count of said plurality of counters reaching a threshold;

a data bus selectively connectable to said plurality of data storage lines enabling data transfers;

an address bus carrying an address for data transfer; and a response circuit connected to each of said at least one of said plurality of data storage lines for storing said portion of non-cacheable data, said plurality of address storage lines, said plurality of indicators and said address bus, said response circuit generating a hit signal when an address on said address bus matches an address stored in one of said plurality of address storage lines and any corresponding indicator does not indicate said portion of said non-cacheable data in said data storage line has expired and otherwise generating a miss signal, said hit signal enabling said data storage line to supply data stored therein to said data bus in response to a data read operation.

21. The microprocessor of claim 20 wherein the number of said plurality of counters is less than the number of said plurality of data storage lines.

22. The microprocessor of claim 20:

and further comprising a plurality of counter identifiers;

wherein each of said plurality of counter identifiers is associated with a corresponding one of said data storage lines;

wherein in a predetermined state each of said plurality of counter identifiers identifies that none of said plurality of counters provides a life span for the data storage line associated with said counter identifier; and wherein in a state other than said predetermined state each of said plurality of counter identifiers identifies one of said plurality of counters to provide a life span for the data storage line associated with said counter identifier.

23. The microprocessor of claim 22:

wherein said indicator for indicating said portion of said non-cacheable data in said data storage circuit is expired in response to said count reaching a threshold comprises a first indicator;

and further comprising a plurality of indicators which include said first indicator;

wherein each of said plurality of indicators is associated with a corresponding one of said data storage lines and a corresponding one of said plurality of counter identifiers;

wherein each of said plurality of indicators indicates whether said portion of data in said corresponding data line is valid or invalid.

24. The microprocessor of claim 23 wherein, for each of said storage lines having a corresponding counter identifier identifying a state other than said predetermined state, said indication of whether said portion of data in said corresponding data line is valid or invalid comprises an indication of whether said count of said counter identified by said corresponding counter identifier is expired in response to said count of said corresponding counter reaching a threshold.

25. A microprocessor for coupling to an external read/write memory having an addressable storage space for storing cacheable data and non-cacheable data, said microprocessor comprising:

a plurality of data storage lines, each of said plurality of data storage lines for storing said portion of non-cacheable data;

a plurality of address storage lines, wherein each of said plurality of address storage lines is for storing an address of data in a corresponding one of said plurality of data storage lines;

a plurality of counters, each of said plurality of counters is for advancing a count from an initial value toward a threshold in response to an activity over time;

a plurality of indicators, each of said plurality of indicators corresponding to one of said plurality of data storage lines for storing said portion of non-cacheable data indicating said portion of said non-cacheable data in said data storage lines is expired in response to a corresponding count of said plurality of counters reaching a threshold;

a data bus selectively connectable to said plurality of data storage lines enabling data transfers;

an address bus carrying an address for data transfer; and a response circuit connected to each of said plurality of data storage lines, said plurality of address storage lines, said plurality of indicators and said address bus, said response circuit generating a hit signal when an address on said address bus matches an address stored in one of said plurality of address storage lines and said corresponding indicator does not indicate said portion of said non-cacheable data in said data storage line has expired and otherwise generating a miss signal, said hit signal enabling said data storage line to supply data stored therein to said data bus in response to a data read operation.

26. The microprocessor of claim 25:

and further comprising a plurality of clean/dirty indicators, wherein each of said plurality of clean/dirty indicators corresponds to one of said data storage circuits;

wherein each of said plurality of clean/dirty indicators is for indicating said portion of said non-cacheable data in said corresponding one of said data storage circuits has been modified after being stored in said data storage circuit;

and further comprising:
  circuitry, in response to said hit, for outputting said portion of said portion of said non-cacheable data from said data storage circuit corresponding to said one of said address storage circuits; and
  circuitry, responsive to said circuitry for outputting said portion of said portion of said non-cacheable data in response to said hit, for setting to clean said clean/dirty indicator corresponding to said data storage circuit corresponding to said one of said address storage circuits.

27. The microprocessor of claim 25:
and further comprising a plurality of valid/invalid indicators, wherein each of said plurality of valid/invalid indicators corresponds to one of said data storage circuits;
wherein each of said plurality of valid/invalid indicators is for indicating said portion of said non-cacheable data in said corresponding one of said data storage circuits is valid or invalid;
and further comprising:
  circuitry, in response to said hit, for outputting said portion of said portion of said non-cacheable data from said data storage circuit corresponding to said one of said address storage circuits; and
  circuitry, responsive to said circuitry for outputting said portion of said portion of said non-cacheable data in response to said hit, for setting to invalid from valid said valid/invalid indicator corresponding to said data storage circuit corresponding to said one of said address storage circuits.

* * * * *